(12) United States Patent
Katsumata et al.

(10) Patent No.: US 11,470,253 B2
(45) Date of Patent: Oct. 11, 2022

(54) DISPLAY DEVICE AND PROGRAM

(71) Applicant: NIKON CORPORATION, Tokyo (JP)

(72) Inventors: Yuki Katsumata, Kawasaki (JP); Naoki Sekiguchi, Yashio (JP)

(73) Assignee: NIKON CORPORATION, Tokyo (JP)

( * ) Notice: Subject to any disclaimer, the term of this patent is extended or adjusted under 35 U.S.C. 154(b) by 200 days.

(21) Appl. No.: 16/335,794

(22) PCT Filed: Sep. 29, 2017

(86) PCT No.: PCT/JP2017/035654
§ 371 (c)(1),
(2) Date: Jul. 9, 2019

(87) PCT Pub. No.: WO2018/062538
PCT Pub. Date: Apr. 5, 2018

(65) Prior Publication Data
US 2019/0335103 A1    Oct. 31, 2019

(30) Foreign Application Priority Data

Sep. 30, 2016   (JP) .............................. JP2016-194631

(51) Int. Cl.
*H04N 5/232*   (2006.01)
*H04N 5/262*   (2006.01)

(52) U.S. Cl.
CPC ..... *H04N 5/23251* (2013.01); *H04N 5/23216* (2013.01); *H04N 5/232933* (2018.08); *H04N 5/262* (2013.01)

(58) Field of Classification Search
CPC ............. H04N 5/232; H04N 5/232121; H04N 5/23216; H04N 5/23235; H04N 5/23245;
(Continued)

(56) References Cited

U.S. PATENT DOCUMENTS 6,075,559 A  *  6/2000  Harada ..................... G06T 9/00
                                                         348/148
7,365,779 B2 *  4/2008  Yamada ................. H04N 19/59
                                                         348/230.1
(Continued)

FOREIGN PATENT DOCUMENTS

JP   2004-172671 A   6/2004
JP   2007-116309 A   5/2007
(Continued)

OTHER PUBLICATIONS

Dec. 19, 2017 International Search Report issued in International Patent Application No. PCT/JP2017/035654.
(Continued)

*Primary Examiner* — Lin Ye
*Assistant Examiner* — Chriss S Yoder, III
(74) *Attorney, Agent, or Firm* — Oliff PLC

(57) ABSTRACT

A display device includes an acquisition unit that acquires moving image data generated by an image-capturing device and velocity information on the image-capturing device while generating the moving image data, and a display control unit that controls a region to be processed for a moving image to be displayed on a display unit using the moving image data, based on the velocity information acquired by the acquisition unit.

6 Claims, 15 Drawing Sheets

(58) Field of Classification Search
CPC ........... H04N 5/23251; H04N 5/23293; H04N 5/232933; H04N 5/23296; H04N 5/2352; H04N 5/262; G09G 5/36
See application file for complete search history.

(56) References Cited

U.S. PATENT DOCUMENTS

| | | | | |
|---|---|---|---|---|
| 8,442,318 | B2* | 5/2013 | Knee | G06T 7/215 |
| | | | | 382/173 |
| 2004/0148640 | A1 | 7/2004 | Masukura et al. | |
| 2011/0134311 | A1* | 6/2011 | Nagao | H04N 5/23216 |
| | | | | 348/349 |
| 2012/0038796 | A1* | 2/2012 | Posa | H04N 5/23296 |
| | | | | 348/240.2 |
| 2014/0028847 | A1* | 1/2014 | Wang | H04N 7/18 |
| | | | | 348/148 |

FOREIGN PATENT DOCUMENTS

| | | | |
|---|---|---|---|
| JP | 2012-205163 A | 10/2012 | |
| JP | 2015-139100 A | 7/2015 | |
| JP | 2015144407 A * | 8/2015 | ............... B60R 1/00 |

OTHER PUBLICATIONS

Aug. 31, 2021 Office Action issued in Japanese Patent Application No. 2018-542967.

* cited by examiner

DISPLAY DEVICE AND PROGRAM

TECHNICAL FIELD

The present invention relates to a display device and a program.

BACKGROUND ART

An image-capturing device attached to a moving person or object to capture a moving image is known (see PTL1). Although the image-capturing device may move during image-capturing, photographing conditions for photographing during movement has been not taken into consideration.

CITATION LIST

Patent Literature

PTL1: Japanese Laid-Open Patent Publication No. 2012-205163

SUMMARY OF INVENTION (1) A display device according to the 1st aspect of the present invention comprises: an acquisition unit that acquires moving image data generated by an image-capturing device and velocity information on the image-capturing device while generating the moving image data; and a display control unit that controls a region to be processed for a moving image to be displayed on a display unit using the moving image data, based on the velocity information acquired by the acquisition unit.

(2) A program according to the 2nd aspect of the present invention that causes the computer to execute comprises: a first step of acquiring moving image data generated by an image-capturing device and velocity information on the image-capturing device while generating the moving image data; and a second step of controlling a region to be processed for a moving image to be displayed on a display unit using the moving image data based on the velocity information acquired in the first step.

(3) A display device according to the 3rd aspect of the present invention comprises: an acquisition unit that acquires moving image data generated by an image-capturing device and information on movement during image-capturing of the image-capturing device; and a control unit that controls display of the moving image data based on the information on the movement acquired by the acquisition unit.

DESCRIPTION OF EMBODIMENTS

First Embodiment

Figure 1:
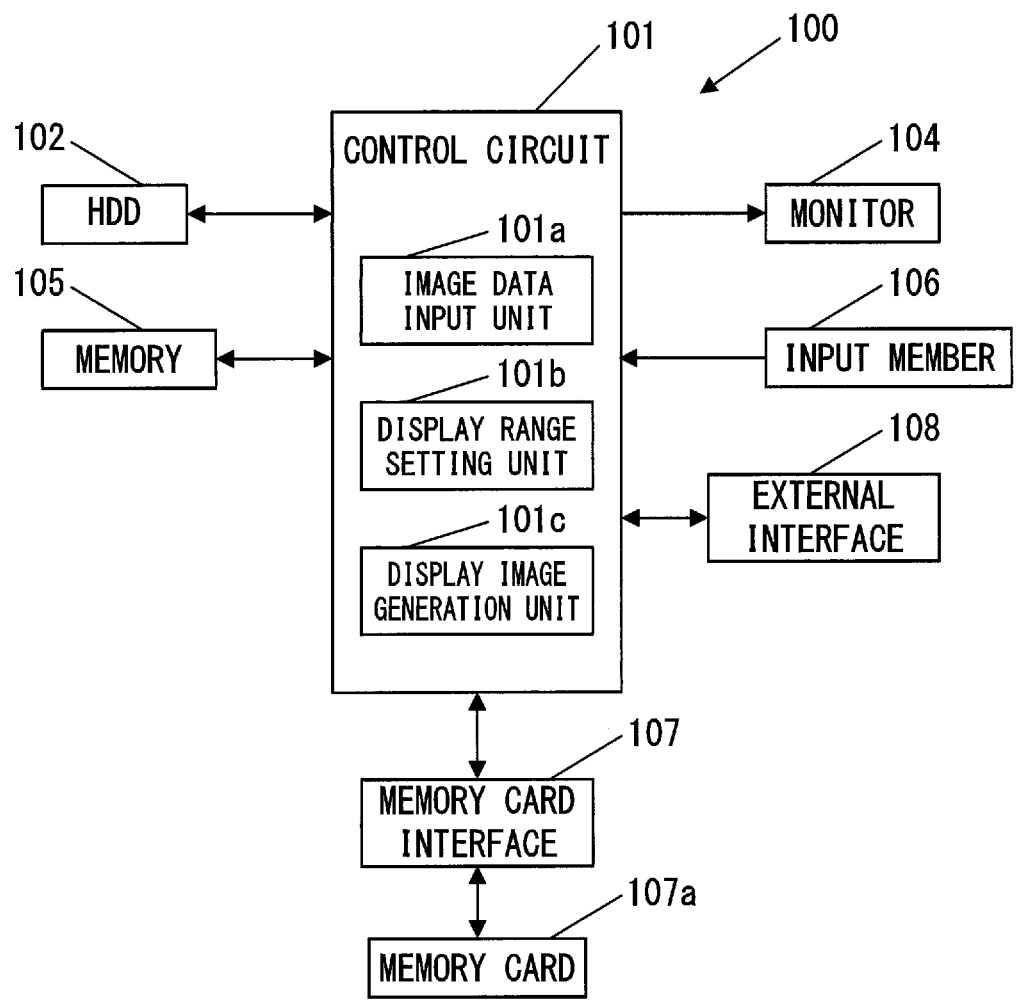
FIG. 1 is a block diagram illustrating main components of an image display device according to the first embodiment.

A first embodiment of an image display device will be described with reference to FIGS. 1 to 5. FIG. 1 is a block diagram showing a configuration of the image display device according to the first embodiment.

The image display device according to the present embodiment comprises a personal computer or the like having a monitor for displaying images. This image display device can display moving images and still images obtained by image-capturing by an external image-capturing device. Details will be described below.

FIG. 1 is a block diagram illustrating main components of an image display device 100 according to the first embodiment. The image display device 100 includes a control circuit 101, a storage device 102 such as an HDD or an SSD, a monitor 104, a memory 105, an input member 106, a memory card interface 107, and an external interface 108.

The input member 106 is an operating member such as a keyboard and a mouse having switches and buttons operated by a user. The user operates the input member 106 when selecting a desired menu or setting from a menu screen displayed on the monitor 104 and causing the selected menu or setting to be executed.

The storage device 102 stores, for example, an image file corresponding to a moving image or a still image photographed by an external image-capturing device. The external interface 108 performs data communication with an external equipment such as an image-capturing device via, for example, a USB interface cable or a wireless transmission path. The image display device 100 receives an image file and the like from a memory card 107a or an external equipment via the memory card interface 107 or the external interface 108. The input image file is recorded in the storage device 102 under a control of the control circuit 101. For example, an image file generated by an external image-capturing device is recorded in the storage device 102 under a control of the control circuit 101. The storage device 102 stores various types of program and the like executed by the control circuit 101.

Note that in the first embodiment, an image file of a moving image generated by an external image-capturing device includes velocity information on the image-capturing device at a time of capturing each frame of the moving image, as described later. In the first embodiment described below, the velocity information will be described as information on moving velocity. Here, velocity information (moving velocity information) is not necessarily provided for every frame, but may be provided at a predetermined frame interval (every 3 frames) or at a predetermined time interval (for example, every 3 seconds). Additionally, moving velocity information (or information capable of calculating the moving velocity) may be provided at every time when a predetermined change in the acceleration occurs. In the following description, moving velocity information on the image-capturing device when capturing each frame of a moving image is also referred to as moving velocity data.

The control circuit 101 is a microcomputer that controls the image display device 100, and includes a CPU, a ROM, and other peripheral circuits. The control circuit 101 functionally has an image data input unit 101a, a display range setting unit 101b, and a display image generation unit 101c.

The image data input unit 101a reads data of an image file recorded in the storage device 102, for example.

The display range setting unit 101b sets a range to be displayed on the monitor 104 for each frame of the moving image. The display image generation unit 101c generates an image signal for display such that the range set by the display range setting unit 101b is displayed on the monitor 104, for each frame of the moving image. The setting of the display range in the display range setting unit 101b and the generation of the image signal for display in the display image generation unit 101c will be described in detail later.

The memory 105 is a working memory of the control circuit 101 and comprises, for example, a SDRAM. The monitor 104 is, for example, a liquid crystal display monitor.

Figure 2:
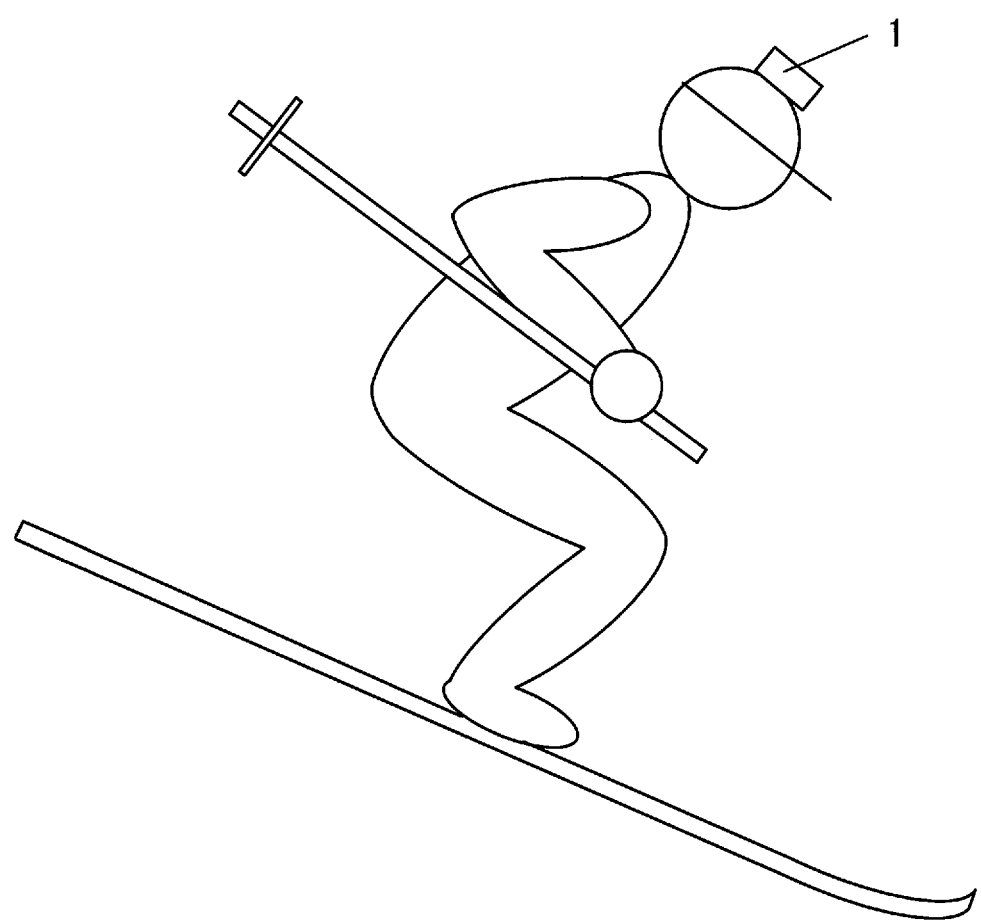
FIG. 2 is a view schematically showing a camera attached to the head of a skier who skis down a slope, as an example of a moving person.

Cameras called action cameras, action cams, wearable cameras, or the like are known as image-capturing devices that are attached to a moving person or object and capture images of subjects to generate moving images and still images. Such a camera can be attached to a moving person or object, for example, to photograph and generate moving images, as shown in FIG. 2. This camera incorporates an acceleration sensor, for example, to calculate a moving velocity of the camera based on a detection output of the acceleration sensor and record the moving velocity of the camera at a time of image-capturing of each frame of the moving image in association with the frame concerned. Further, the moving velocity calculation unit 34b may calculate the moving velocity of the camera 1 based on a signal from a global positioning system (GPS). FIG. 2 is a view schematically showing a camera 1 attached to the head of a skier (athlete) who skis down a slope, as an example of a moving person. In the example shown in FIG. 2, the camera 1 is attached to the head of the skier; however, the camera 1 may be attached to the chest or arm of the skier or may be attached to a ski plate.

Figure 3:
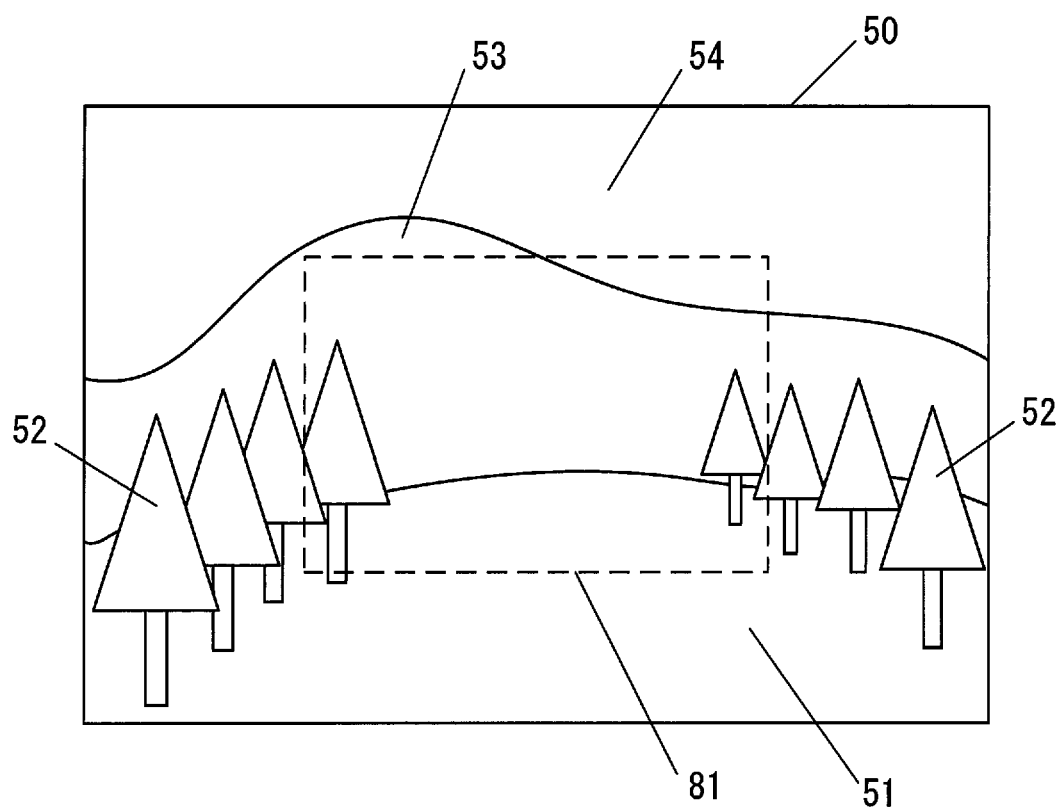
FIG. 3 is an example of an image in a frame of a moving image captured by the camera 1 attached to the head of the skier as shown in FIG. 2.

FIG. 3 is an example of an image in a frame of a moving image captured and generated by the camera 1 attached to the head of the skier as shown in FIG. 2. FIG. 3 shows a state of a slope. This image 50 includes a plurality of trees 52 located on both sides of a slope 51 covered with snow. The image 50 also includes a mountain 53 behind the slope 51, and a sky 54 above the mountain 53.

Generally, with this type of camera, photographing is often performed with a short focal length, that is, a wide angle of view of the photographing optical system. When the camera 1 moves during image-capturing, a wide angle of view may result in a reduction in the sense of speed. For example, in a case where the camera 1 moves with a person as shown in FIG. 2, for example, a moving surrounding scene such as the trees 52 in FIG. 3 is recorded in a moving image obtained by image-capturing with the camera 1. However, a sense of speed may be reduced during reproduction. As a result, when the photographed and generated moving image is reproduced, a viewer feels a less sense of speed than that actually experienced by the skier during photographing.

Generally, a field of view of a human tends to become smaller as the moving velocity of the human increases. With the camera 1, a range indicated in the image 50 is captured. However, as the skier skis down at a higher speed, a field of view of the skier becomes smaller to a range indicated by a frame 81, for example.

Therefore, in the image display device 100 according to the first embodiment, the range of the moving image displayed on the monitor 104 becomes smaller in a scene where the moving velocity of the camera 1 increases, in order to allow the viewer of the moving image to feel a sense of speed. That is, in the image display device 100 according to the first embodiment, in a scene where the moving velocity of the camera 1 increases, only a part of an image obtained by image-capturing is cut out, and the cut-out image is enlarged and displayed on the monitor 104. This enables the viewer to feel the sense of speed actually experienced by the skier during photographing. Note that the image display device 100 displays an entire range of an image obtained by image-capturing on the monitor 104, in a scene where the moving velocity of the camera 1 is low.

Specifically, the control circuit 101 changes a range of the image displayed on the monitor 104 based on the moving velocity of the camera 1 and displays the changed range on the monitor 104, in the following manner.

The image data input unit 101a of the control circuit 101 reads image data item of each frame of the moving image and moving velocity data, which is information on a moving velocity V of the camera 1 at a time of capturing each frame, from the image file of the moving image recorded in the storage device 102.

For a frame in which the moving velocity V of the camera 1 is equal to or more than a first predetermined value V1, the display range setting unit 101b of the control circuit 101 performs a cropping process for cutting out a part of the image of the frame. In the following description, a region cut out by the cropping process is referred to as a cropped region. For example, the display range setting unit 101b sets a range surrounded by the frame 81 for an image 50 of FIG. 3 as a cropped region by the cropping process.

Specifically, for a frame in which the moving velocity V of the camera 1 is equal to or more than a first predetermined value V1, and less than a second predetermined value V2, which is higher than the first predetermined value V1, the display range setting unit 101b sets a first cropped region for the image of the frame.

Further, for a frame in which the moving velocity V of the camera 1 is equal to or more than the second predetermined value V2, the display range setting unit 101b sets a second cropped region, which is smaller than the first cropped region, for the image of the frame.

Note that the display range setting unit 101b does not perform the cropping process on a frame in which the moving velocity V of the camera 1 is less than the first predetermined value V1 or a frame in which no moving velocity data is present.

The sizes of the first cropped region and the second cropped region may be preset sizes or may be variable values that vary depending on image-capturing conditions such as a focal length, an exposure time, an ISO sensitivity, an aperture value, and a frame rate during image-capturing, which are recorded in the image file.

Note that changing the size of the cropped region in two stages in accordance with the moving velocity V of the camera 1 as described above is merely one example, and the size of the cropped region may be changed in one stage, or in three or more stages. Further, instead of changing the size of the cropped region in accordance with the moving velocity V in stages as described above, the size of the cropped region may be continuously changed in accordance with the moving velocity V of the camera 1. Specifically, the size of the cropped region may be reduced as the moving velocity of the camera 1 increases. For example, as the moving velocity of the camera 1 increases, the size of the cropped region may be continuously reduced from the cropped region set in the initial setting.

Note that the central position of the cropped region may be the central position of the image of the frame, or may be a position determined based on a moving direction of the camera 1 estimated from a moving direction of a subject in the moving image. Further, among subjects in the moving image, a subject present in substantially the same direction as the moving direction of the camera 1 estimated as described above may be detected and the detected subject may be estimated as a subject that the photographer is looking at. The central position of this subject may then be set as the central position of the cropped region.

Furthermore, the user may be allowed to set the central position of the cropped region. For example, it is desirable that the user can operate the input member 106 to set the central position of the cropped region when the user notices, during reproduction of a moving image, that an orientation of the camera 1 and a moving direction of the camera 1 during image-capturing deviated from each other.

Note that, for convenience of the enlarging process described later, the cropped region desirably has a rectangular shape having the same aspect ratio as that of the image obtained by image-capturing.

The display image generation unit 101c of the control circuit 101 performs an enlarging process of enlarging the image of the cropped region cut out by the cropping process to the size of the original image before the cropping process. Then, the image after the enlarging process is set as an image for display of the frame. Thus, during reproduction of the frame, the monitor 104 displays the image after the enlarging process.

Note that the display image generation unit 101c does not perform the above-described enlarging process in a case where the above-described cropping process has not been performed, but the display image generation unit 101c sets the image read by the image data input unit 101a as the image for display of the frame. Therefore, during reproduction of the frame, the monitor 104 displays the image recorded in the storage device 102 as it is.

Figure 4:
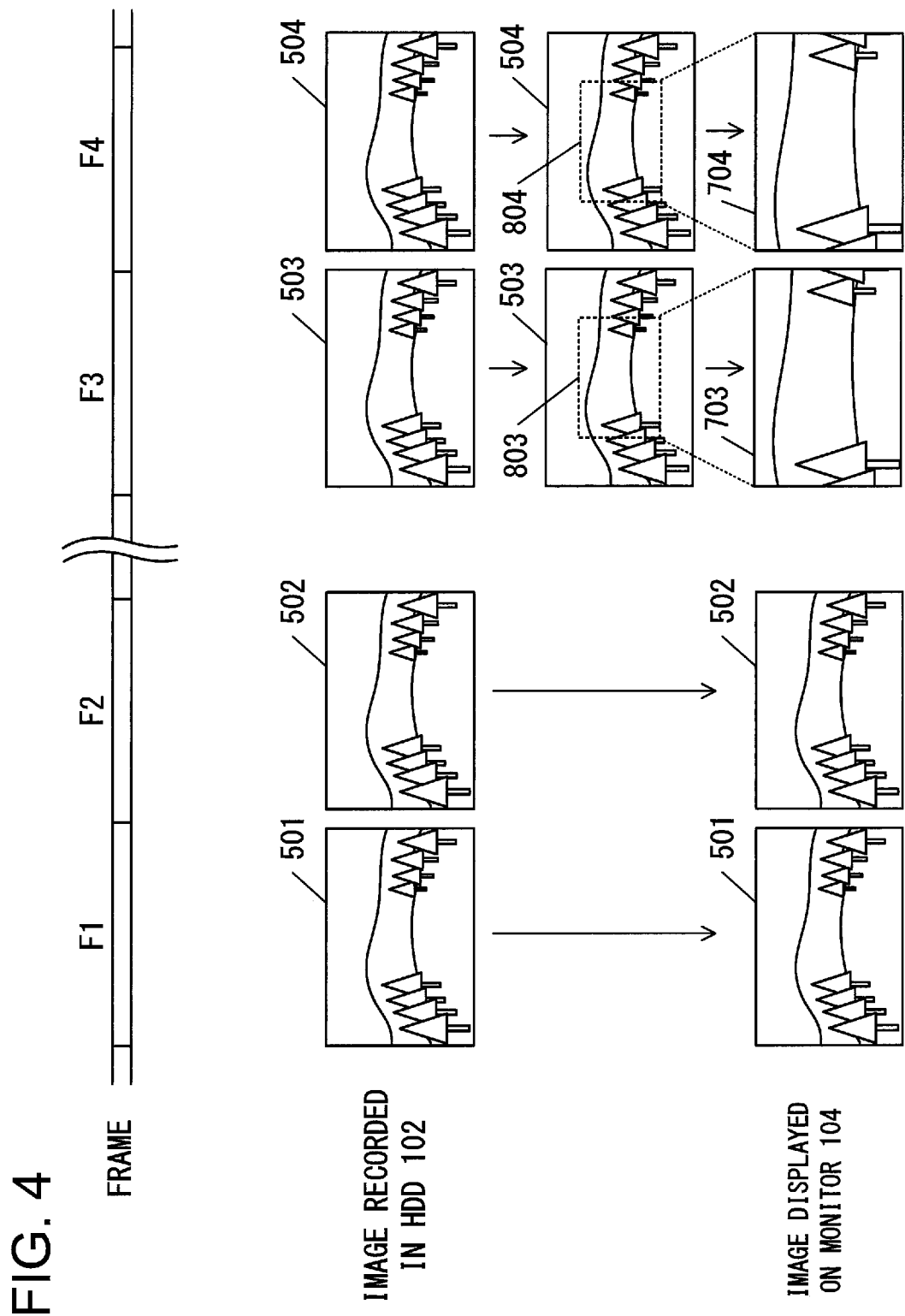
FIG. 4 is a diagram showing a relationship between images of frames of the moving image recorded in the storage device and images displayed on the monitor.

FIG. 4 is a diagram showing a relationship between images of frames of the moving image recorded in the storage device 102 and images displayed on the monitor 104.

If the moving velocity V of the camera 1 during image-capturing of each of the frames F1, F2 is less than the first predetermined value V1, the display image generation unit 101c does not perform the above-described cropping process and enlarging process on images 501, 502 of the frames F1, F2 recorded in the storage device 102. The display image generation unit 101c sets images of the images 501, 502 of the frames F1, F2 recorded in the storage device 102 as images for display of the frames F1, F2. Thus, the monitor 104 displays the images 501, 502.

For example, a case where the moving velocity V of the camera 1 during image-capturing of the frame F3 is equal to or more than the first predetermined value V1 will be described. In this case, the display image generation unit 101c performs the above-described cropping process on the image 503 of the frame F3 recorded in the storage device 102. That is, the display image generation unit 101c sets the cropped region 803 for the image 503 of the frame F3 recorded in the storage device 102, and cuts out the set cropped region 803.

Note that if the moving velocity V of the camera 1 during image-capturing of the frame F3 is equal to or more than the first predetermined value V1 and less than the second predetermined value V2, the display image generation unit 101c sets the first cropped region for the image 503. Furthermore, if the moving velocity V of the camera 1 during image-capturing of the frame F3 is equal to or more than the second predetermined value V2, the display image generation unit 101c sets the second cropped region for the image 503.

Then, the display image generation unit 101c enlarges the image of the cropped region 803 cut out by the cropping process to the size of the image 503 before the cropping process, and sets the enlarged image 703 as an image for display of the frame F3. Thus, the monitor 104 displays the image 703 after the enlargement.

If the moving velocity V of the camera 1 during image-capturing of the frame F4 is equal to or more than the first predetermined value V1, the display image generation unit 101b and the display image generation unit 101c also perform the above-described cropping process and the enlarging process for the image 504 of the frame 4. That is, the display image generation unit 101b sets the cropped region 804 for the image 504 and cuts out the set cropped region 804. Then, the display image generation unit 101c enlarges the image of the cropped region 804 to the size of the original image 504 before the cropping process, and sets the enlarged image 704 as an image for display of the frame F4. Thus, the monitor 104 displays the image 704 after the enlargement.

As described above, in a scene where the moving velocity V of the camera 1 increases, a part of the image is enlarged and displayed on the monitor 104. Thus, as the moving velocity V of the camera 1 increases, the viewer feels that the field of view is smaller when viewing a moving image displayed on the monitor 104. This can prevent a reduction in a sense of speed, thereby giving a viewer viewing the moving image a realistic sense of presence. Note that when the cropped region is changed from the region of a frame F2 to the region of a frame F3 as in the example of FIG. 4, the cropped region may be gradually made smaller from the image 502 until the image 703 of the cropped region 803 is displayed, instead of changing the image 502 to the image 703.

Figure 5:
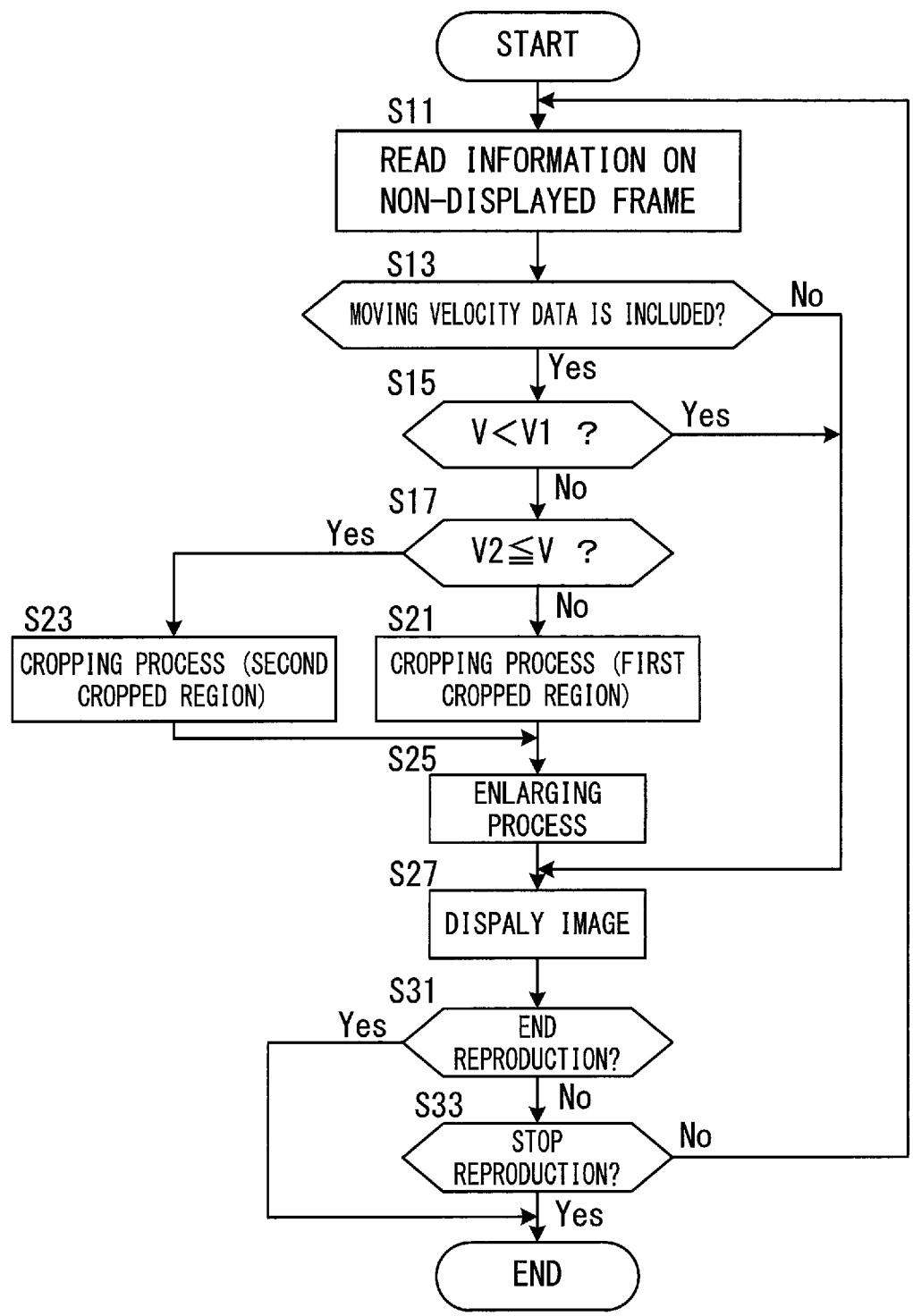
FIG. 5 is a flowchart showing a process performed by the image display device according to the first embodiment.

FIG. 5 is a flowchart showing a process performed by the image display device 100 according to the first embodiment. For example, when the user operates the input member 106 to instruct reproduction of an image file of a moving image recorded in the storage device 102, the process shown in FIG. 5 is executed by the control circuit 101.

In step S11, the control circuit 101 reads information on a frame (non-displayed frame) which has not yet been displayed, that is, image data and moving velocity data recorded in the storage device 102. The process then proceeds to step S13. In step S13, the control circuit 101 determines whether moving velocity data is included in the information on the non-displayed frame read in step S11.

If the moving velocity data is included in the information on the non-displayed frame read in step S11, the determination result in step S13 is Yes and the process then proceeds to step S15. In step S15, the display range setting unit 101b of the control circuit 101 determines whether the moving velocity V of the camera 1 read in step S11 is less than a first predetermined value V1.

If the moving velocity V of the camera 1 read in step S11 is equal to or more than the first predetermined value V1, the determination result in step S15 is No and the process then proceeds to step S17. In step S17, the display range setting unit 101b of the control circuit 101 determines whether the moving velocity V of the camera 1 read in step S11 is equal to or more than a second predetermined value V2.

If the moving velocity V of the camera 1 read in step S11 is less than the second predetermined value V2, the determination result in step S17 is No and the process then proceeds to step S21. In step S21, the display range setting unit 101b of the control circuit 101 performs the cropping process for cutting out the first cropped region as described above for the image of the non-displayed frame. The process then proceeds to step S25.

If the moving velocity V of the camera 1 read in step S11 is equal to or more than the second predetermined value V2, the determination result in step S17 is Yes and the process then proceeds to step S23. In step S23, the display range setting unit 101b of the control circuit 101 performs the cropping process for cutting out a second cropped region, which is smaller than the first cropped region, as described above for the image of the non-displayed frame. The process then proceeds to step S25.

In step S25, the display image generation unit 101c of the control circuit 101 performs the above-described enlarging process on the image of the cropped region cut out by the cropping process in step S21 or step S23. The process then proceeds to step S27. In step S27, the control circuit 101 displays the image after the enlarging process in step S25 on the monitor 104. The process then proceeds to step S31.

In step S31, the control circuit 101 determines whether the reproduction has ended, that is, whether images of all frames included in the image file of the moving image instructed to be reproduced have been displayed. If the determination result in step S31 is Yes, the program ends. If the determination result in step S31 is No, the process then proceeds to step S33. In step S33, the control circuit 101 determines whether the user has operated the input member 106 and has instructed to stop the reproduction of the image file of the moving image, for example. If the determination result in step S33 is No, the process returns to step S11. If the determination result in step S33 is Yes, the control circuit 101 ends the program.

If moving velocity data is not included in the information on the non-displayed frame read in step S11, the determination result in step S13 is No and the process then proceeds to step S27. In step 27, the control circuit 101 displays the image of the non-displayed frame read in step S11 on the monitor 104. The process then proceeds to step S31.

The same applies to a case where the moving velocity V of the camera 1 read in step S11 is less than the first predetermined value V1. That is, if the moving velocity V of the camera 1 read in step S11 is less than the first predetermined value V1, the determination result in step S15 is Yes and the process then proceeds to step S27. In step S27, the control circuit 101 displays the image of the non-displayed frame read in step S11 on the monitor 104 and the process then proceeds to step S31.

According to the first embodiment described above, the following operational effects can be obtained.

(1) The image display device 100 includes the image data input unit 101a that acquires the moving image captured by the camera 1 and the moving velocity data on the moving velocity V of the camera during image-capturing; the display range setting unit 101b that determines a displayed region of the moving image based on the moving velocity V acquired by the image data input unit 101a; and the monitor 104 that displays a moving image in the displayed region determined by the display range setting unit 101b.

Thus, in a scene where the moving velocity V of the camera 1 increases, a part of the image displayed on the monitor 104 can be enlarged and displayed on the monitor 104. Thus, as the moving velocity V of the camera 1 increases, the viewer feels that the field of view is smaller when viewing the moving image displayed on the monitor 104. This can prevent a reduction in a sense of speed, thereby giving a viewer viewing the moving image a realistic sense of presence.

(2) The display range setting unit 101b makes the displayed region smaller as the moving velocity V increases. Thus, in a scene where the moving velocity V of the camera 1 increases, a part of the image, which is to be displayed on the monitor 104, is enlarged and displayed on the monitor 104. Thus, as the moving velocity V of the camera 1 increases, the viewer feels that the field of view is smaller when viewing a moving image displayed on the monitor 104. This can prevent a reduction in a sense of speed, thereby giving a viewer viewing the moving image a realistic sense of presence.

Second Embodiment

A second embodiment of the image display device will be described with reference to FIGS. 6 to 8. In the following description, the same components as those in the first embodiment are designated by the same reference numerals, and differences will mainly be described. Features not specifically described are the same as in the first embodiment. The present embodiment mainly differs from the first embodiment in that image sharpness of a peripheral portion of the image is reduced in a scene where the moving velocity V of the camera 1 increases, instead of enlarging a part of the image.

As described above, generally, a field of view of a human tends to become smaller as the moving velocity of the human increases. Therefore, in the image display device 100 according to the second embodiment, sharpness of a peripheral portion of the moving image displayed on the monitor 104 is reduced so that the range of the moving image displayed on the monitor 104 appears to become smaller in a scene where the moving velocity of the camera 1 increases, in order to allow the viewer of the moving image to feel a sense of speed.

Figure 6:
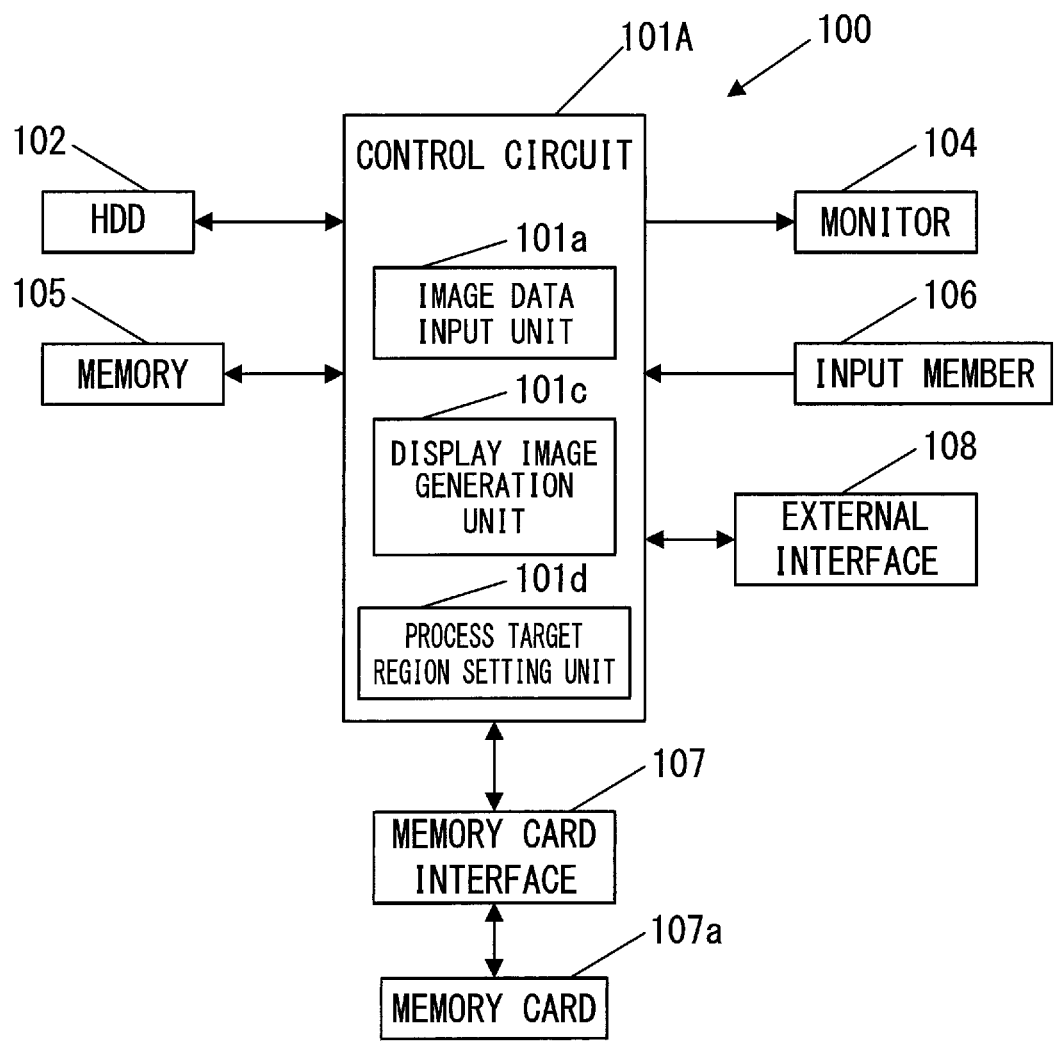
FIG. 6 is a block diagram showing a configuration of a camera according to a second embodiment.

FIG. 6 is a block diagram showing a configuration of a camera 1 according to a second embodiment. The control circuit 101A functionally has an image data input unit 101a, a display image generation unit 101c, and a process target region setting unit 101d. The process target region setting unit 101d performs a region setting process for setting a region for which sharpness of a peripheral portion of the image of the frame is reduced, for a frame in which the moving velocity V of the camera 1 is equal to or more than the first predetermined value V1. The display image generation unit 101c performs a sharpness reduction process for reducing the sharpness of the region set by the target region setting process. Hereinafter, the region setting process and the sharpness reduction process will be described.

In the present embodiment, the sharpness reduction process is a process of performing at least one of the following processes (a) to (d) on a region on the peripheral side of the image:

(a) blur the image, e.g., blur the image contour;
(b) reduce contrast;
(c) reduce saturation;
(d) reduce brightness; and
(e) add blur.

Here, "add blur" mentioned in (e) is to give an image blur similar to that in a case where the exposure time is extended. In the following description, giving an image blur in this way is referred to as "adding blur", "giving blur", or the like.

When the exposure time is short, the image blur is reduced more than necessary so that a viewer may feel less smoothness during reproduction, which may result in a reduction in the sense of speed. In such a case, by adding blur, the moving image is smoothly reproduced with an appropriate image blur so that a viewer viewing the reproduced moving image can feel a sense of speed and enjoy a realistic sense of presence.

In the following description, a region subjected to the sharpness reduction process is referred to as a process target region, and a region not subjected to the sharpness reduction process is referred to as a non-target region. FIG. 7 is a view for explaining a process target region and a non-target region. For example, the process target region setting unit 101d sets a hatched region outside a frame 82 as a process target region 83 for an image 50 of a certain frame by the region setting process. A region inside the frame 82 is a non-target region 84. Note that the frame 82 and the hatching lines in FIG. 7 are illustrated for convenience of explanation and they do not appear when the image 50 is reproduced.

Note that a central position of the non-target region 84 may be a central position of the image of the frame or may be a position determined based on the moving direction of the camera 1 estimated from the moving direction of a subject in the moving image. Further, among subjects in the moving image, a subject present in substantially the same direction as the moving direction of the camera 1 estimated as described above may be detected, and the detected subject may be estimated as a subject that the photographer is thought to be looking at. The central position of the subject may then be set as the central position of the non-target region 84.

Furthermore, the user may be allowed to set the central position of the cropped region. For example, it is desirable that the user can operate the input member 106 to set the central position of the non-target region 84 when the user notices, during reproduction of a moving image, that an orientation of the camera 1 and a moving direction of the camera 1 during image-capturing are deviated from each other.

Figure 7:
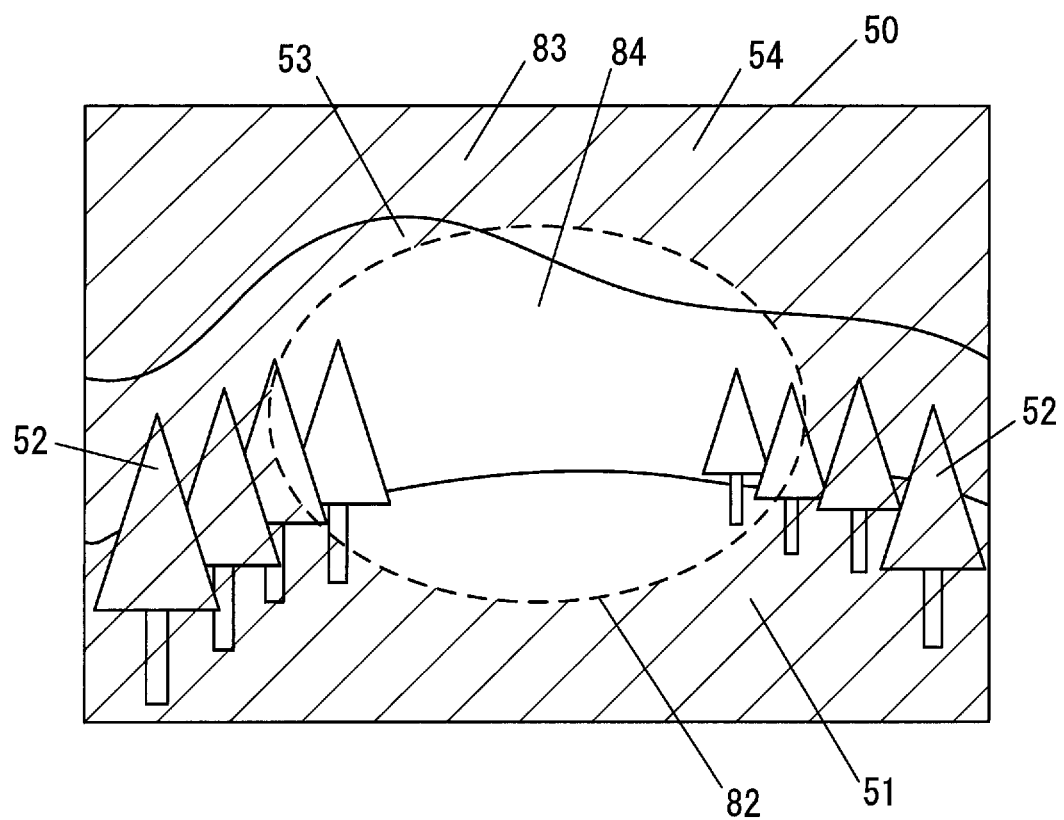
FIG. 7 is a view for explaining a process target region and a non-target region.

Note that the shape of the non-target region 84 may also be an elliptical shape as shown in FIG. 7, a circular shape, a rectangular shape, or a closed shape made up of straight lines or curved lines.

For a frame in which the moving velocity V of the camera 1 is equal to or more than a first predetermined value V1 and less than a second predetermined value V2, the process target region setting unit 101d sets a first process target region for the image of the frame. For a frame in which the moving velocity V of the camera 1 is equal to or more than a second predetermined value V2, the process target region setting unit 101d sets a second process target region, which is larger than a first process target region, for the image of the frame. That is, the process target region setting unit 101d sets the process target region 83 so that the process target region 83 becomes larger, in other words, the non-target region 84 becomes smaller as the moving velocity V of the camera 1 increases.

The sizes of the first process target region and the second process target region may be preset sizes or may be variable values that vary depending on image-capturing conditions such as a focal length, an exposure time, an ISO sensitivity, an aperture value, and a frame rate during image-capturing, which are recorded in the image file.

Note that changing the size of the process target region in two stages in accordance with the moving velocity V of the camera 1 as described above is merely one example, and the size of the process target region may be changed in one stage, or in three or more stages. Further, instead of changing the size of the process target region in accordance with the moving velocity V in stages as described above, the size of the process target region may be continuously changed in accordance with the moving velocity V of the camera 1. Specifically, the size of the process target region may be increased as the moving velocity V of the camera 1 increases. For example, as the moving velocity of the camera 1 increases, the size of the process target region may be continuously increased from the process target region set in the initial setting.

The display image generation unit 101c performs the above-described sharpness reduction process on the set process target region and generates an image signal for display. Therefore, when the frame is reproduced, the monitor 104 displays an image having its peripheral portion with a reduced sharpness.

Note that the display image generation unit 101c may perform the sharpness reduction process so that the entire process target region becomes uniformly unsharp or may perform the sharpness reduction process so that sharpness is reduced as the distance from the non-target region increases. Specifically, the display image generation unit 101c increases a degree of blurring an image or a degree of blur to be added as a distance from the non-target region increases. Further, for example, the image display generation unit 34b may reduce at least one of contrast, saturation, and brightness as the distance from the non-target region increases. Only one of the contrast reduction, the saturation reduction, the brightness reduction and the blur addition may be performed, or two or more types of image processing may be performed in combination.

Additionally, the display image generation unit 101c may perform the sharpness reduction process so that the process target region becomes unsharp as the moving velocity V of the camera 1 increases.

Note that the process target region setting unit 101d does not perform the target setting process on a frame in which the moving velocity V of the camera 1 is less than the first predetermined value V1 or a frame in which no information on the moving velocity V is present.

The display image generation unit 101c does not perform the above-described sharpness reduction process in a case where the above-described region setting process has not been performed, but the display image generation unit 101c sets the image read by the image data input unit 101a as an image for display of the frame. Therefore, during reproduction of the frame, the monitor 104 displays the image recorded in the storage device 102 as it is.

As described above, in a scene where the moving velocity V of the camera 1 increases, the monitor 104 displays an image having its peripheral portion with a reduced sharpness. Thus, in a scene where the moving velocity V of the camera 1 increases, the viewer feels that the field of view is smaller when viewing a moving image displayed on the monitor 104. This can prevent a reduction in a sense of speed, thereby giving a viewer viewing the moving image a realistic sense of presence.

Figure 8:
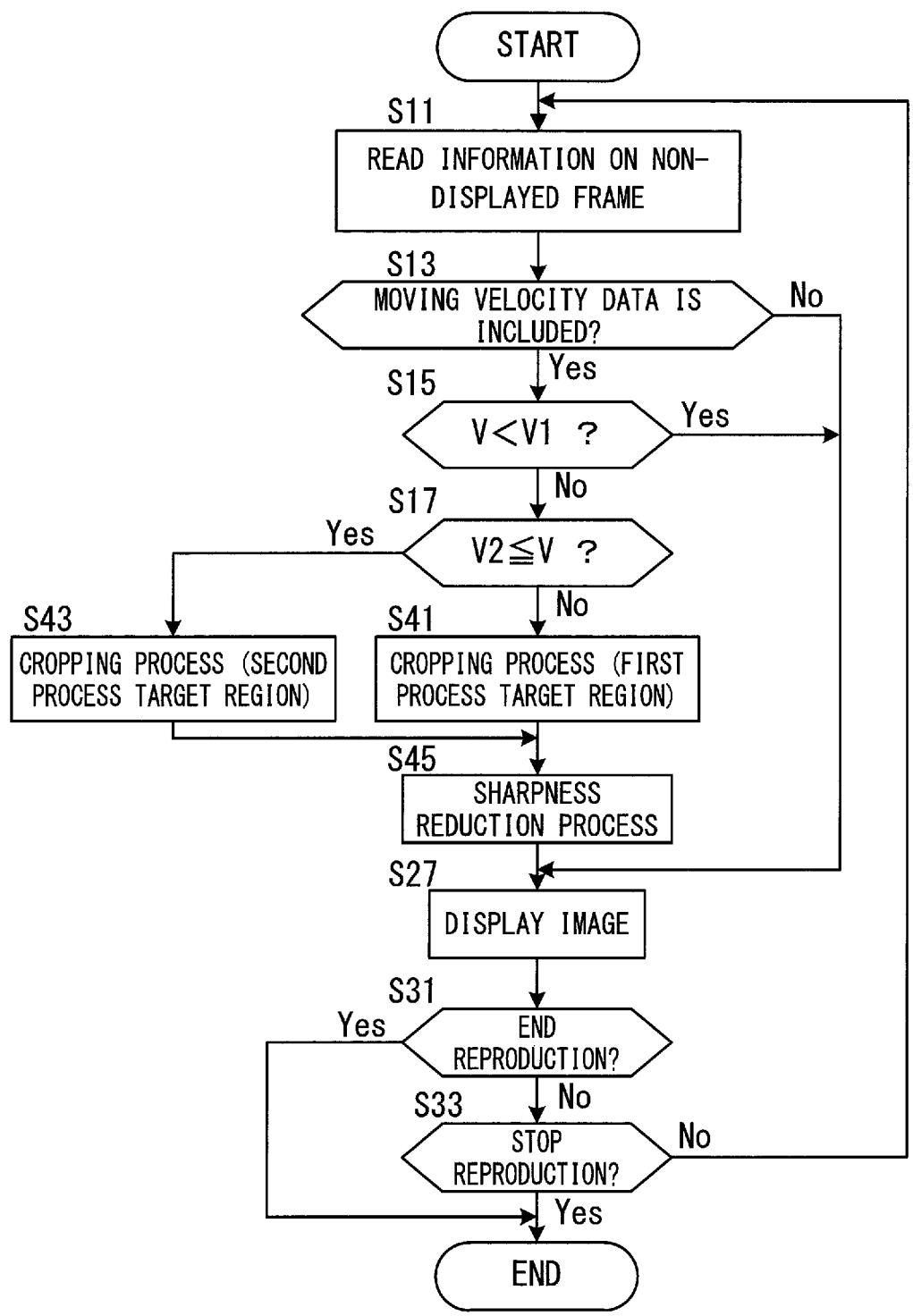
FIG. 8 is a flowchart showing a process performed by the image display device according to the second embodiment.

FIG. 8 is a flowchart showing a process performed by the image display device 100 according to the second embodiment. For example, when the user operates the input member 106 to instruct reproduction of an image file of a moving image recorded in the storage device 102, the process shown in FIG. 8 is executed by the control circuit 101A. Steps S11 to S15 are the same as those in the first embodiment shown in FIG. 5.

In step S17, the process target region setting unit 101d of the control circuit 101A determines whether the moving velocity V of the camera 1 read in step S11 is equal to or more than a second predetermined value V2.

If the moving velocity V of the camera 1 read in step S11 is less than the second predetermined value V2, the determination result in step S17 is No and the process then proceeds to step S41. In step S41, the process target region setting unit 101d of the control circuit 101A sets a first process target region as described above. The process then proceeds to step S45.

If the moving velocity V of the camera 1 read in step S11 is equal to or more than the second predetermined value V2, the determination result in step S17 is Yes and the process then proceeds to step S43. In step S43, the process target region setting unit 101d of the control circuit 101A sets a second process target region, which is larger than the first process target region, as described above. The process then proceeds to step S45.

In step S45, the display image generation unit 101c of the control circuit 101A performs the above-described sharpness reduction process on the set process target region. The process then proceeds to step S27. In step S27, the control circuit 101 displays the image after the sharpness reduction process in step S45 on the monitor 104. The process then proceeds to step S31. Steps after S31 are the same as those in the first embodiment shown in FIG. 5.

The camera 1 according to the second embodiment has the following operational effects, in addition to the operational effects as in the first embodiment.

(1) The image display device 100 includes the image data input unit 101a that acquires the moving image captured by the camera 1 and the moving velocity data on the moving velocity V of the camera 1 during image-capturing; the process target region setting unit 101d and the display image generation unit 101c that perform a process of making an image of a peripheral region of the moving image unsharp, based on the moving velocity V acquired by the image data input unit 101a; and the monitor 104 that displays a moving image processed in the process target region setting unit 101d and the display image generation unit 101c.

Thus, in a scene where the moving velocity V of the camera 1 increases, the sharpness of a peripheral region of the image displayed on the monitor 104 can be reduced. Thus, as the moving velocity V of the camera 1 increases, the viewer feels that the field of view is smaller when viewing a moving image displayed on the monitor 104. This can prevent a reduction in a sense of speed, thereby giving a viewer viewing the moving image a realistic sense of presence.

(2) The process target region setting unit 101d extends a region whose image is made unsharp in a case where the moving velocity V increases. Thus, in a scene where the moving velocity V of the camera 1 increases, a region having a reduced sharpness in the image displayed on the monitor 104 is extended. Thus, the viewer feels that the field of view is smaller when viewing a moving image displayed on the monitor 104. This can prevent a reduction in a sense of speed, thereby giving a viewer viewing the moving image a realistic sense of presence.

(3) The display image generation unit 101c makes an image more unsharp when the moving velocity V increases. Thus, in a scene where the moving velocity V of the camera 1 increases, sharpness of a peripheral portion in the image displayed on the monitor 104 is further reduced. Thus, the viewer feels that the field of view is smaller when viewing a moving image displayed on the monitor 104. This can prevent a reduction in a sense of speed, thereby giving a viewer viewing the moving image a realistic sense of presence.

(4) The display image generation unit 101c makes an image more unsharp as the distance from the central region of the moving image increases. Thus, the viewer feels that the field of view is smaller when viewing a moving image displayed on the monitor 104. This can prevent a reduction in a sense of speed, thereby giving a viewer viewing the moving image a realistic sense of presence.

Third Embodiment

A third embodiment will be described with reference to FIGS. 9 to 11. In the following description, the same components as those in the first and second embodiments are designated by the same reference numerals, and differences will mainly be described. Features not specifically described are the same as in the first and second embodiments. The third embodiment differs from the first embodiment mainly in that an angle of view of a moving image is changed during image-capturing.

In the first embodiment described above, a moving image obtained by image-capturing without changing the angle of view is enlarged and displayed in a scene where the moving velocity of the camera 1 increases during reproduction. That is, in the first embodiment, the angle of view is changed during reproduction. In contrast, in the third embodiment, the angle of view is changed during image-capturing. That is, in the camera 1 according to the third embodiment, when the moving velocity V of the camera 1 increases, only a part of an image obtained by image-capturing is cut out, and the cut-out image is enlarged and recorded.

Figure 9:
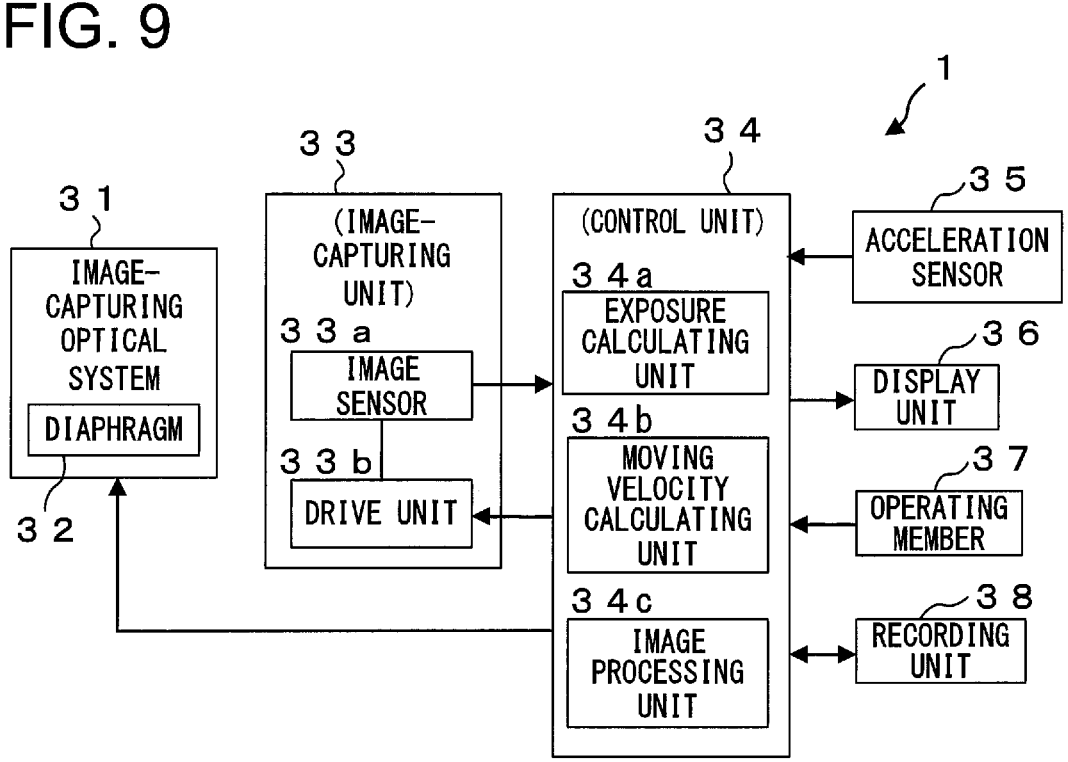
FIG. 9 is a block diagram showing a configuration of a camera according to a third embodiment.

FIG. 9 is a block diagram showing a configuration of a camera 1 according to a third embodiment. The camera 1 includes an image-capturing optical system 31, an image-capturing unit 33, a control unit 34, an acceleration sensor 35, a display unit 36, an operation member 37, and a recording unit 38.

The image-capturing optical system 31 guides a light flux from an object scene to the image-capturing unit 33. The image-capturing optical system 31 is provided with a diaphragm 32 in addition to lenses (not shown). The image-capturing unit 33 includes an image sensor 33a and a drive unit 33b, and photoelectrically converts a subject image formed by the image-capturing optical system 31 to generate an electric charge. The drive unit 33b generates a drive signal required for causing the image sensor 33a to perform exposure control, that is, electric charge accumulation control. Image-capturing instructions such as exposure time to the image-capturing unit 33 are transmitted from the control unit 34 to the drive unit 33b.

The control unit 34 includes a CPU, for example, and controls overall operation of the camera 1. For example, the control unit 34 performs a predetermined exposure calculation based on a photoelectric conversion signal acquired by the image-capturing unit 33 to determine exposure conditions such as the electric charge accumulation time (exposure time) of the image sensor 33a, an ISO sensitivity, an aperture value of the diaphragm 32 required for a proper exposure and instruct them to the drive unit 33b and the diaphragm 32.

The control unit 34 includes an exposure calculation unit 34a, a moving velocity calculation unit 34b, and an image processing unit 34c. The units are implemented in software by the control unit 34 executing program stored in a nonvolatile memory (not shown); however, the units may include an ASIC and the like.

The exposure calculation unit 34a detects brightness of the subject based on the image signal from the image sensor 33a to determine the exposure time, the ISO sensitivity, and the aperture value required for a proper exposure.

The moving velocity calculation unit 34b calculates a moving velocity of the camera 1 based on information on an acceleration of the camera 1.

The image processing unit 34c performs image processing on the image data acquired by the image-capturing unit 33. The image processing includes, for example, color interpolation processing, pixel defect correction processing, edge enhancement processing, noise reduction processing, white balance adjustment processing, gamma correction processing, display brightness adjustment processing, saturation adjustment processing, and the like. Further, the image processing unit 34c generates an image to be displayed by the display unit 36. The image processing unit 34c can further perform a cropping process at image-capturing and an enlarging process at image-capturing, which will be described in detail later.

The acceleration sensor 35 detects the acceleration of the camera 1 and outputs the detected result to the moving velocity calculation unit 34b of the control unit 34. The moving velocity calculation unit 34b then calculates the moving velocity of the camera 1 based on the acceleration detected by the acceleration sensor 35.

The display unit 36 reproduces and displays images generated by the image processing unit 34c, images subjected to image processing, images read by the recording unit 38, and the like. The display unit 36 also displays an operation menu screen, a setting screen for setting image-capturing conditions, and the like.

The operation member 37 includes various operation members such as a release button and a menu button. The operation member 37 sends operation signals corresponding to operations to the control unit 34. The operation member 37 also includes a touch operation member provided on a display surface of the display unit 36.

In accordance with the instruction from the control unit 34, the recording unit 38 records image data and the like in a recording medium including a memory card (not shown) and the like. Further, the recording unit 38 reads the image data recorded in the recording medium in accordance with the instruction from the control unit 34.

The camera 1 configured as described above can capture still images and moving images and record image data obtained by image-capturing in the recording medium. Additionally, the camera 1 is suitably attached to a moving person or object to capture images, as shown in FIG. 2.

Cropping Process at Image-Capturing and Enlarging Process at Image-Capturing

The cropping process at image-capturing is a process of cropping a part of an image obtained by image-capturing. In the following description, a region cut out by the cropping process at image-capturing is referred to as a cropped region at image-capturing. For example, the image 50 of FIG. 3 will be mentioned as an example. The image processing unit 34c sets a range surrounded by the frame 81 as the cropped region at image-capturing, for the image 50.

Note that a central position of the cropped region at image-capturing may be a central position of the image obtained by image-capturing or may be a position determined based on the moving direction of the camera 1. Note that, for convenience of the enlarging process at image-capturing described later, the cropped region at image-capturing desirably has a rectangular shape having the same aspect ratio as that of the image obtained by image-capturing.

If the moving velocity V of the camera 1 is equal to or more than the first predetermined value V1 and less than the second predetermined value V2, the image processing unit 34c sets a first cropped region at image-capturing for the image obtained by image-capturing. Further, if the moving velocity V of the camera 1 is equal to or more than the second predetermined value V2, the image processing unit 34c sets a second cropped region at image-capturing, which is smaller than the first cropped region at image-capturing.

The enlarging process at image-capturing is a process of enlarging the image of the cropped region at image-capturing cut out by the above-described cropping process at image-capturing to a size of an original image before the cropping process at image-capturing.

The image processing unit 34c handles an image data item of the image obtained by the cropping process at image-capturing and the enlarging process at image-capturing described above, instead of the image data item of the image obtained by image-capturing, as an image data item for recording.

Note that if the moving velocity V of the camera 1 calculated by the moving velocity calculation unit 34b is less than the first predetermined value V1, the image processing unit 34c handles the image data item of the image obtained by image-capturing as the image data item for recording, without performing the cropping process at image-capturing and the enlarging process at image-capturing described above. Note that when a captured and cropped image is recorded, the image may be recorded without the enlarging process of the moving image generated by cropping.

Figure 10:
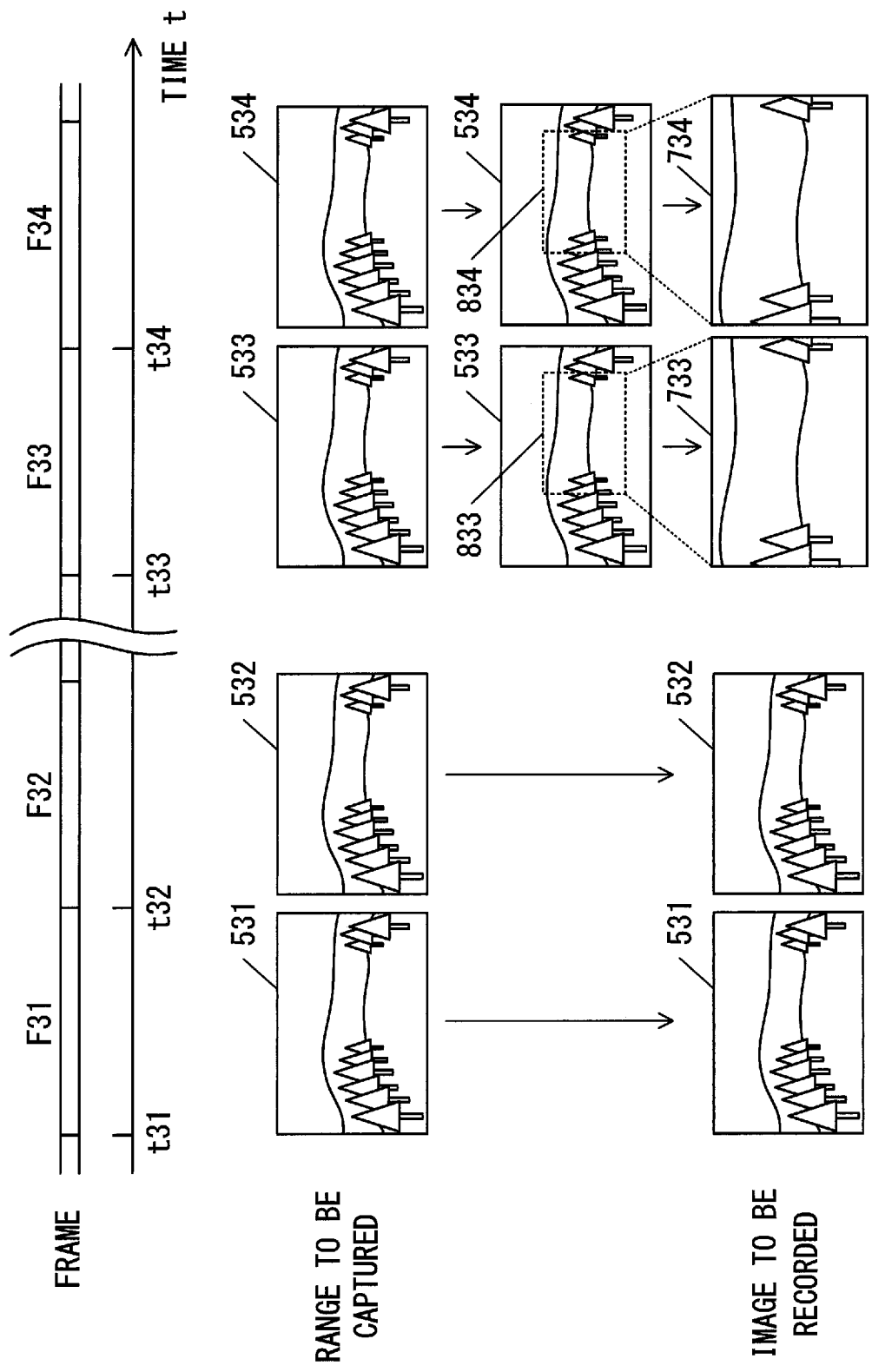
FIG. 10 is a diagram showing a relationship between images obtained by image-capturing in frames in the third embodiment and images obtained in the embodiment.

FIG. 10 is a diagram showing a relationship between images obtained by image-capturing in frames and images obtained in the present embodiment.

It is assumed that, at time points t31, t32, the moving velocity V of the camera 1 is less than the first predetermined value V1. In this case, the image processing unit 34c does not perform the cropping process at image-capturing and the enlarging process at image-capturing, which are described above, on images 531, 532 obtained by image-capturing in the frames F31, F32 in which exposure starts from the time points t31, t32. The image processing unit 34c handles image data items of the images 531, 532 obtained by image-capturing in the frames F31, F32 as image data items for recording.

The following description relates to a case where the moving velocity V of the camera 1 increases between time points t32 and t33 to be equal to or more than the first predetermined value V1, for example. In this case, the image processing unit 34c performs the above-described cropping process at image-capturing and enlarging process at image-capturing, which are described above, on the image 533 obtained by image-capturing in the frame F33 in which exposure starts from the time point t33. That is, the image processing unit 34c sets a cropped region at image-capturing 833 for the image 533 obtained by image-capturing in the frame F33 in which exposure starts from the time point t33, and cuts out the set cropped region at image-capturing 833. In the example shown in FIG. 10, the image processing unit 34c sets a central position of the cropped region at image-capturing 833 to a position determined based on the moving direction of the camera 1.

Note that if the moving velocity V of the camera 1 is equal to or more than the first predetermined value V1 and less than the second predetermined value V2, the image processing unit 34c sets a first cropped region at image-capturing for the image 533. Furthermore, if the moving velocity V of the camera 1 is equal to or more than the second predetermined value V2, the image processing unit 34c sets a second cropped region at image-capturing for the image 533.

Then, the image processing unit 34c performs a process of enlarging the image of the cropped region at image-capturing 833 to the size of the original image 533 before the cropping process at image-capturing to obtain an image data item of the image 733. The image processing unit 34c handles the image data item of the image 733 as an image data item for recording in the frame F33.

If the moving velocity V of the camera 1 is equal to or more than the first predetermined value V1 between the time point t33 and the time point t34, the image processing unit 34c performs the above-described cropping process at image-capturing and the enlarging process at image-capturing also on an image 534 obtained by image-capturing in the Frame F34 in which exposure starts from a time point t34. That is, the image processing unit 34c sets a cropped region at image-capturing 834 for the image 534 and cuts out the set cropped region at image-capturing 834. Then, the image processing unit 34c performs a process of enlarging the image of the cropped region at image-capturing 834 to the size of the original image 534 before the cropping process at image-capturing to obtain an image data item of the image 734. The image processing unit 34c handles the image data item of the image 734 as an image data item for recording in the frame F34.

In this way, a range of the recorded image becomes smaller when the moving velocity V of the camera 1 increases. Therefore, when viewing the moving image captured by the camera 1 according to the present embodiment, a viewer feels that the field of view is smaller as the moving velocity of the camera 1 increases. This can prevent a reduction in a sense of speed, thereby giving a viewer viewing the moving image a realistic sense of presence.

Figure 11:
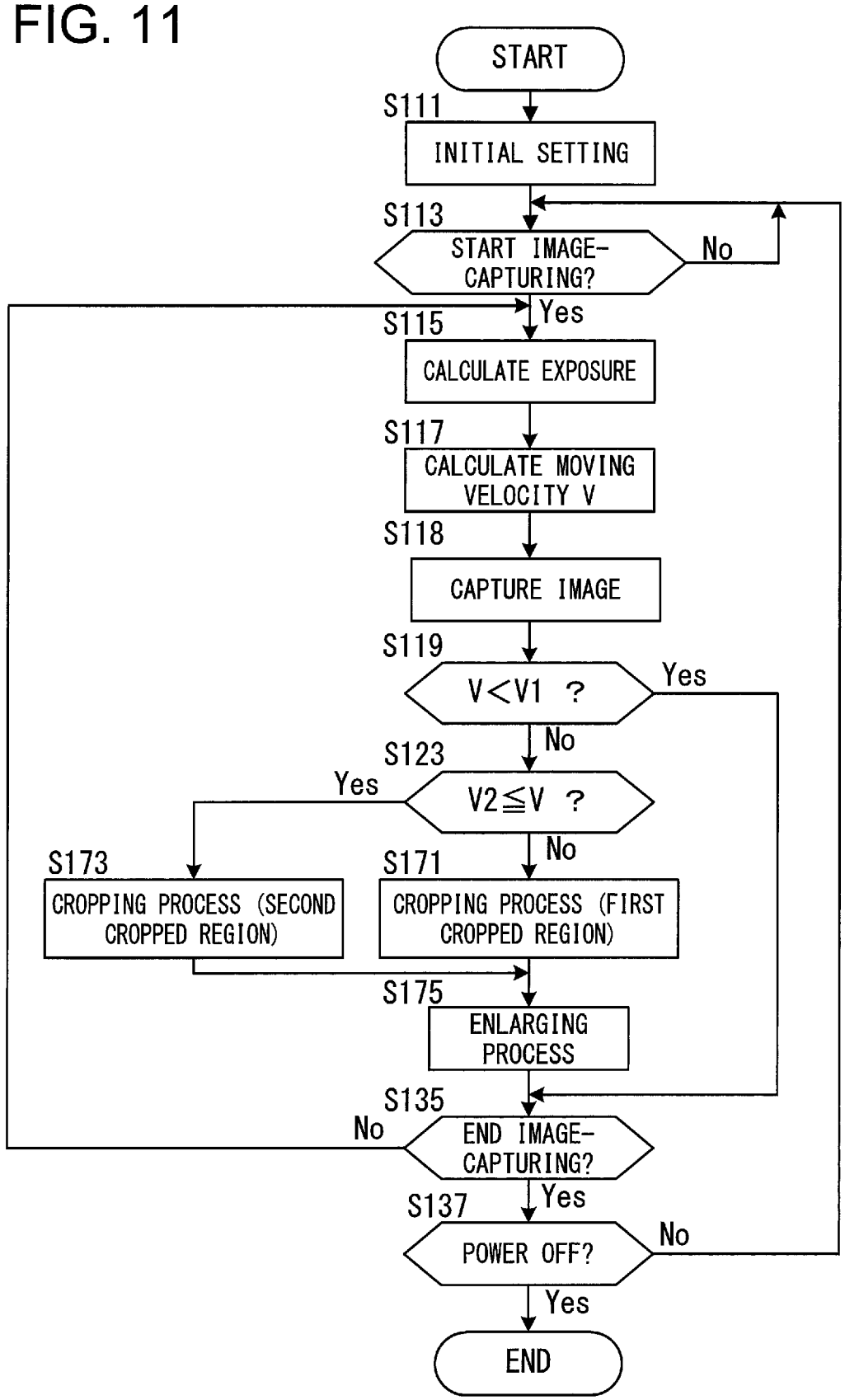
FIG. 11 is a flowchart showing a process relating to image-capturing by the camera according to the third embodiment.

FIG. 11 is a flowchart showing a process relating to image-capturing by the camera 1 according to the third embodiment. When a power switch (not shown) of the camera 1 is turned on, the process shown in FIG. 11 is executed by the control unit 34. In step S111, the control unit 34 performs an initial setting such as reading a value of a frame rate that is preset by the user. The process then proceeds to step S113. In step S113, the control unit 34 waits until the start of image-capturing of a moving image is instructed by operation of a release button, for example.

When the start of image-capturing is instructed, the control unit 34 starts photographing of a moving image under the image-capturing conditions in the initial setting. The process then proceeds to S115.

In step S115, the exposure calculation unit 34a of the control unit 34 detects brightness of a subject based on an image signal from the image sensor 33a and determines an exposure time, an ISO sensitivity, and a diaphragm value providing a proper exposure. The process proceeds to step S117. In step S117, the moving velocity calculation unit 34b of the control unit 34 calculates a moving velocity of the camera 1 based on information on an acceleration of the camera 1 detected by the acceleration sensor 35. The process then proceeds to step S118.

In step S118, the control unit 34 controls the image-capturing unit 33 and the diaphragm 32 so as to capture an image with the exposure time, the ISO sensitivity, and the aperture value calculated in step S115. The process then proceeds to step S119. In step S119, the image-capturing control unit 34c of the control unit 34 determines whether the moving velocity V of the camera 1 calculated in step S117 is less than a first predetermined value V1. If the determination result in step S19 is Yes, the process proceeds to step S135. Processes after step S135 will be described later.

If the moving velocity V of the camera 1 calculated in step S117 is equal to or more than the first predetermined value V1, the determination result in step S119 is No. The process then proceeds to step S123. In step S123, the image-capturing control unit 34c of the control unit 34 determines whether the moving velocity V of the camera 1 calculated in step S117 is equal to or more than a second predetermined value V2.

If the moving velocity V of the camera 1 calculated in step S117 is less than the second predetermined value V2, the determination result in step S23 is No and the process proceeds to step S171. In step S171, the image processing unit 34c of the control unit 34 performs the cropping process at image-capturing for cutting out the first cropped region at image-capturing as described above. The process then proceeds to step S175.

If the moving velocity V of the camera 1 calculated in step S117 is equal to or more than the second predetermined value V2, the determination result in step S123 is Yes and the process proceeds to step S173. In step S173, the image processing unit 34c of the control unit 34 performs the cropping process at image-capturing for cutting out the second cropped region at image-capturing as described above. The process then proceeds to step S175.

In step S175, the image processing unit 34c of the control unit 34 performs the above-described enlarging process at image-capturing on the image of the cropped region at image-capturing which is cut out by the cropping process at image-capturing in step S171 or step S173. The process then proceeds to step S135.

In step S135, the control unit 34 determines whether termination of the image-capturing of the moving image is instructed. If the determination result in step S35 is No, the process returns to step S115. If the determination result in step S135 is Yes, the process proceeds to step S137.

In step S137, the control unit 34 determines whether a power switch (not shown) is turned off. If the determination result in step S137 is No, the process returns to step S113. If the determination result in step S137 is Yes, the program ends.

The camera 1 according to the third embodiment has the following operational effects, in addition to those of the embodiments described above.

(1) The camera 1 further includes an image processing unit 34c that performs image processing on a signal generated by the image sensor 33a. In a case where the moving velocity V detected by the acceleration sensor 35 and the moving velocity calculation unit 34b increases, the image processing unit 34c cuts out only a part of the image obtained by image-capturing and enlarges the cut-out image. The recording unit 38 records the image enlarged by the image processing unit 34c.

When viewing the moving image captured by the camera 1 according to the present embodiment, a viewer feels that the field of view is smaller as the moving velocity of the camera 1 increases. This can prevent a reduction in a sense of speed, thereby giving a viewer viewing the moving image a realistic sense of presence.

Fourth Embodiment

A fourth embodiment of an image-capturing device will be described with reference to FIG. 12. In the following description, the same components as those in the first to third embodiments are designated by the same reference numerals, and differences will mainly be described. Features not specifically described are the same as in the first to third embodiments. The fourth embodiment mainly differs from the third embodiment in that image sharpness of a peripheral portion of the image is reduced when the moving velocity V of the camera 1 increases, instead of changing the angle of view of the moving image. In other words, the fourth embodiment differs from the second embodiment in that image sharpness of a peripheral portion of the image is reduced during image-capturing and the resulting image is recorded.

As described above, generally, a field of view of a human tends to become smaller as the moving velocity of the human increases. Therefore, in the camera 1 according to the fourth embodiment, sharpness of a peripheral portion of the image obtained by image-capturing is reduced as the moving velocity V of the camera 1 increases, and the resulting image is recorded. Thus, a viewer of the moving image feels that the range of the moving image is smaller as the moving velocity V of the camera 1 increases.

The configuration of the camera 1 according to the fourth embodiment is the same as that of the camera 1 according to the third embodiment shown in FIG. 9. Note that in the camera 1 according to the fourth embodiment, the image processing unit 34c of the control unit 34 may perform a sharpness reduction process at image-capturing for reducing sharpness of a peripheral portion of an image, instead of the cropping process at image-capturing and the enlarging process at image-capturing. The sharpness reduction process at image-capturing will be described below.

In the present embodiment, the sharpness reduction process at image-capturing is a process of performing at least one of the following processes (a) to (d) on a region on the peripheral side of the image obtained by image-capturing:

(a) blur the image, i.e., make the image contour unsharp;
(b) reduce contrast;
(c) reduce saturation; and
(d) reduce brightness.

Note that a process of adding blur may be performed as in the second embodiment.

In the following description, a region subjected to the sharpness reduction process at image-capturing is referred to as a process target region at image-capturing, and a region not subjected to the sharpness reduction process at image-capturing is referred to as a non-target region at image-capturing. The process target region at image-capturing corresponds to the process target region 83 in the second embodiment (see FIG. 7), and the non-target region at image-capturing corresponds to the non-target region 84 in the second embodiment. The image processing unit 34c sets a process target region at image-capturing for an image obtained by image-capturing.

Note that a central position of the non-target region at image-capturing may be a central position of the image obtained by image-capturing or may be a position determined based on the moving direction of the camera 1. Note that the shape of the non-target region at image-capturing may also be an elliptical shape in the same manner as the non-target region 84 of the second embodiment, a circular shape, a rectangular shape, or a closed shape made up of straight lines or curved lines.

If the moving velocity V of the camera 1 is equal to or more than the first predetermined value V1 and less than the second predetermined value V2, the image processing unit 34c sets a first cropped region at image-capturing for the image obtained by image-capturing. If the moving velocity V of the camera 1 is equal to or more than the second predetermined value V2, the image processing unit 34c sets a second process target region at image-capturing, which is larger than the first process target region at image-capturing. That is, the image processing unit 34c sets the process target region at image-capturing so that the process target region at image-capturing becomes larger, in other words, the non-target region 84 becomes smaller as the moving velocity V of the camera 1 increases. The image processing unit 34c then performs the above-described sharpness reduction process at image-capturing on the set process target region at image-capturing.

Note that the image processing unit 34c may perform the sharpness reduction process at image-capturing so that the entire process target region at image-capturing becomes uniformly unsharp or performs the sharpness reduction process so that sharpness is reduced as the distance from the non-target region at image-capturing increases. Specifically, the image processing unit 34c increases the degree of blurring the image as the distance from the non-target region increases. Further, for example, the image processing unit 34b may reduce at least one of contrast, saturation, and brightness as the distance from the non-target region becomes larger. Only one of the contrast reduction, the saturation reduction, and the brightness reduction may be performed, or two or more types of image processing may be performed in combination.

The image processing unit 34c handles an image data item of the image obtained by the above-described sharpness reduction process at image-capturing as an image data item for recording, instead of the image data item of the image obtained by image-capturing.

Note that if the moving velocity V of the camera 1 calculated by the moving velocity calculation unit 34b is less than the first predetermined value V1, the image processing unit 34c handles the image data item of the image obtained by image-capturing as the image data item for recording, without performing the sharpness reduction process at image-capturing.

In this way, sharpness of a peripheral portion of the recorded image becomes lower as the moving velocity V of the camera 1 increases. Therefore, when viewing the moving image captured by the camera 1 according to the present embodiment, a viewer feels that the field of view is smaller as the moving velocity of the camera 1 increases. This can prevent a reduction in a sense of speed, thereby giving a viewer viewing the moving image a realistic sense of presence.

Figure 12:
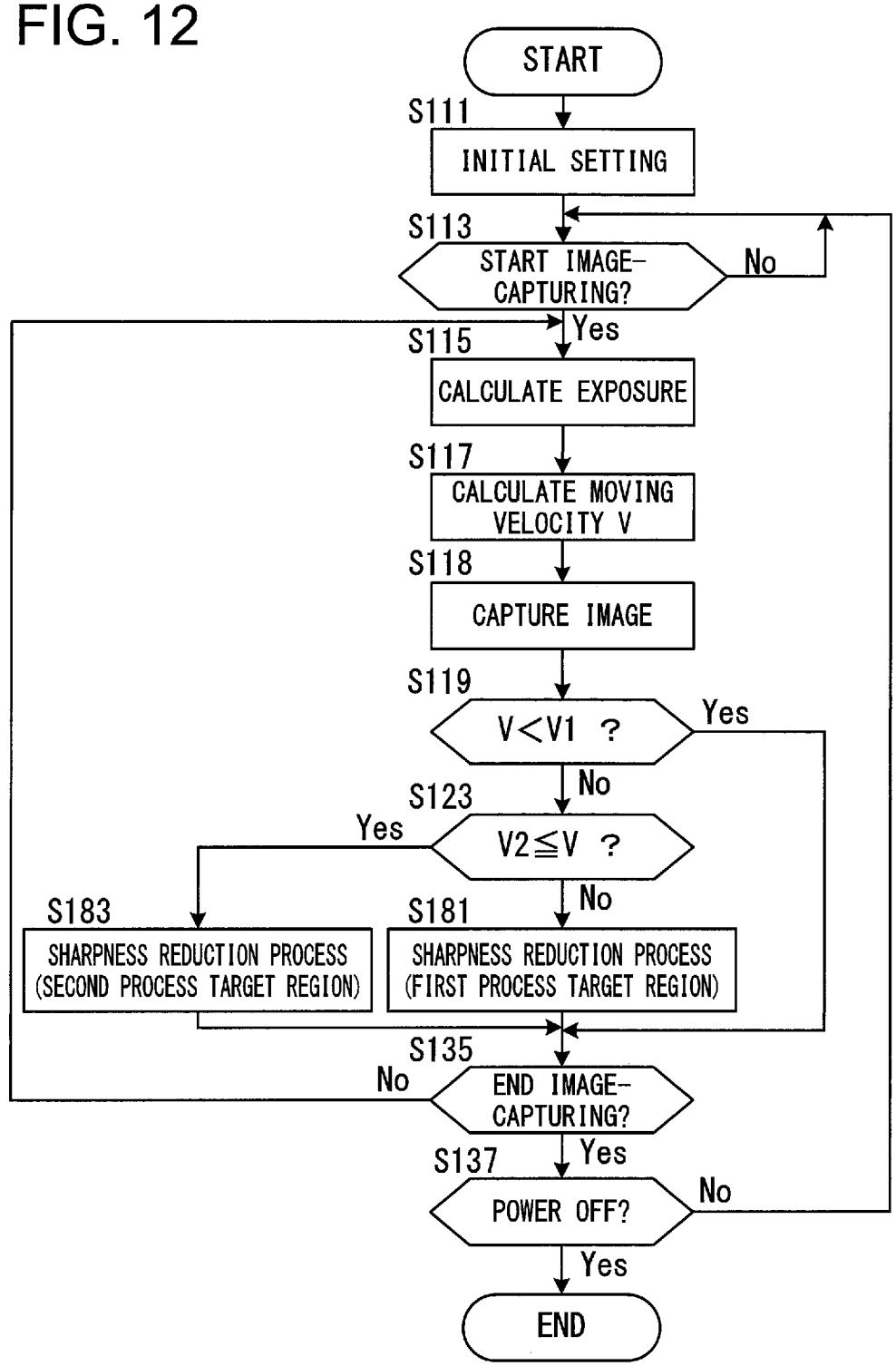
FIG. 12 is a flowchart showing a process relating to image-capturing by the camera according to the fourth embodiment.

FIG. 12 is a flowchart showing a process relating to image-capturing by the camera 1 according to the fourth embodiment. When a power switch (not shown) of the camera 1 is turned on, the process shown in FIG. 12 is executed by the control unit 34. Steps S111 to S123 are the same as those in the third embodiment shown in FIG. 11.

In step S123, the image-capturing control unit 34c of the control unit 34 determines whether the moving velocity V of the camera 1 calculated in step S117 is equal to or more than a second predetermined value V2.

If the moving velocity V of the camera 1 calculated in step S117 is less than the second predetermined value V2, the determination result in step S123 is No and the process proceeds to step S181. In step S181, the image processing unit 34c of the control unit 34 sets the first process target region at image-capturing as described above to perform the sharpness reduction process at image-capturing. The process then proceeds to step S135.

If the moving velocity V of the camera 1 calculated in step S117 is equal to or more than the second predetermined value V2, the determination result in step S123 is Yes and the process proceeds to step S183. In step S183, the image processing unit 34c of the control unit 34 sets the second process target region at image-capturing as described above to perform the sharpness reduction process at image-capturing. The process then proceeds to step S135.

The camera 1 according to the fourth embodiment has the following operational effects, in addition to those of the embodiments described above.

(1) The camera 1 includes an image processing unit 34c that performs image processing on a signal generated by the image sensor 33a. The image processing unit 34c performs the sharpness reduction process at image-capturing for reducing sharpness of a peripheral portion of the image obtained by image-capturing in a case where the moving velocity V detected by the acceleration sensor 35 and the moving velocity calculation unit 34b increases. The recording unit 38 records the image subjected to the sharpness reduction process at image-capturing.

When viewing the moving image captured by the camera 1 according to the present embodiment, a viewer feels that the field of view is smaller as the moving velocity of the camera 1 increases. This can prevent a reduction in a sense of speed, thereby giving a viewer viewing the moving image a realistic sense of presence.

Note that in the camera 1 according to the fourth embodiment, the image-capturing unit 33 may capture images under the same condition for all regions of an image-capturing surface of the image sensor 33a, or may capture images under an individual condition for each region of the image-capturing surface of the image sensor 33a. In this case, for example, different image-capturing conditions may be set for a region of the image-capturing surface corresponding to the process target region at image-capturing and a region of the image-capturing surface corresponding to the non-target region at image-capturing. In the following description, a region of the image-capturing surface corresponding to the process target region at image-capturing is referred to as a first region, and a region of the image-capturing surface corresponding to the non-target region at image-capturing is referred to as a second region.

For example, the control unit 34 may set a sensitivity of the first region lower than a sensitivity of the second region. This achieves the same operational effects as in the case where the above-described sharpness reduction process at image-capturing is performed, because the brightness of an image of the process target region at image-capturing is lower than that of an image of the non-target region at image-capturing.

For example, the control unit 34 may set an exposure time of the first region longer than an exposure time of the second region and set the sensitivity of the first region lower than that of the second region so that a proper exposure is achieved even if the exposure time varies depending on the regions. This achieves the same operational effects as in the case where the image blur is added as in the second embodiment, because an amount of an image blur of the image in the process target region at image-capturing becomes larger than an amount of an image blur of the image in the non-target region at image-capturing.

For example, the control unit 34 reduces a frame rate of the first region to be lower than a frame rate of the second region. This allows the exposure time of the first region to be set further longer than the exposure time of the second region, so that the operational effect in the case of adding blur as in the second embodiment can be further enhanced.

The following modifications are also within the scope of the present invention, and one or more of the modifications may also be combined with the above-described embodiments.

First Modification

In the above-described first and second embodiments, the cropping process, the enlarging process, and the like are automatically performed in a scene where the moving velocity of the camera 1 increases. In contrast, in a first modification, the user can set whether the cropping process, the enlarging process, and the like are performed during reproduction of a moving image, by selecting a reproduction mode.

In the image display device 100 according to the first modification, for example, any one of four reproduction modes, that is, a normal mode, a first reality mode, a second reality mode, and a fast forward mode can be set. The user can set one of the four reproduction modes by operating the input member 106, for example.

When the normal mode is selected as the reproduction mode, the control circuit 101 does not perform a cropping process, an enlarging process, a region setting process, and a sharpness reduction process during reproduction of a moving image. Therefore, when the normal mode is selected as the reproduction mode, the moving image of the image file recorded in the storage device 102 is reproduced as it is and displayed on the monitor 104. The normal mode is a reproduction mode suitable for a case where the user desires to view a moving image while maintaining a wide angle.

When the first reality mode is selected as the reproduction mode, the control circuit 101 performs a cropping process and an enlarging process during reproduction of a moving image, as in the first embodiment. The first reality mode is a reproduction mode suitable for a case where the user desires to feel more realistic sense of presence of a moving image.

When the second reality mode is selected as the reproduction mode, the control circuit 101 performs a region setting process and a sharpness reduction process during reproduction of a moving image, as in the second embodiment. The second reality mode is a reproduction mode suitable for a case where the user desires to feel more realistic sense of presence of a moving image, without reducing a range of the image displayed on the monitor 104.

When the fast forward mode is selected as the reproduction mode, the control circuit 101 reproduces a moving image at a reproduction speed faster than a normal reproduction speed, during reproduction of the moving image. Note that the realistic sense of presence is reduced if the reproduction speed is too fast. It is therefore desirable that the reproduction speed in the fast forward mode is set to, for example, about 1.1 to 1.3 times the normal reproduction speed. In the same manner as the first reality mode and the second reality mode, the fast forward mode is a reproduction mode suitable for a case where the user desires to feel more realistic sense of presence of a moving image.

Second Modification

In the first and second embodiments described above, the image display device 100 comprises a personal computer or the like. The image display device 100 may comprise a high-performance mobile phone 250 (FIG. 13) provided with a camera function, such as a smartphone, or a mobile equipment such as a tablet terminal.

Figure 13:
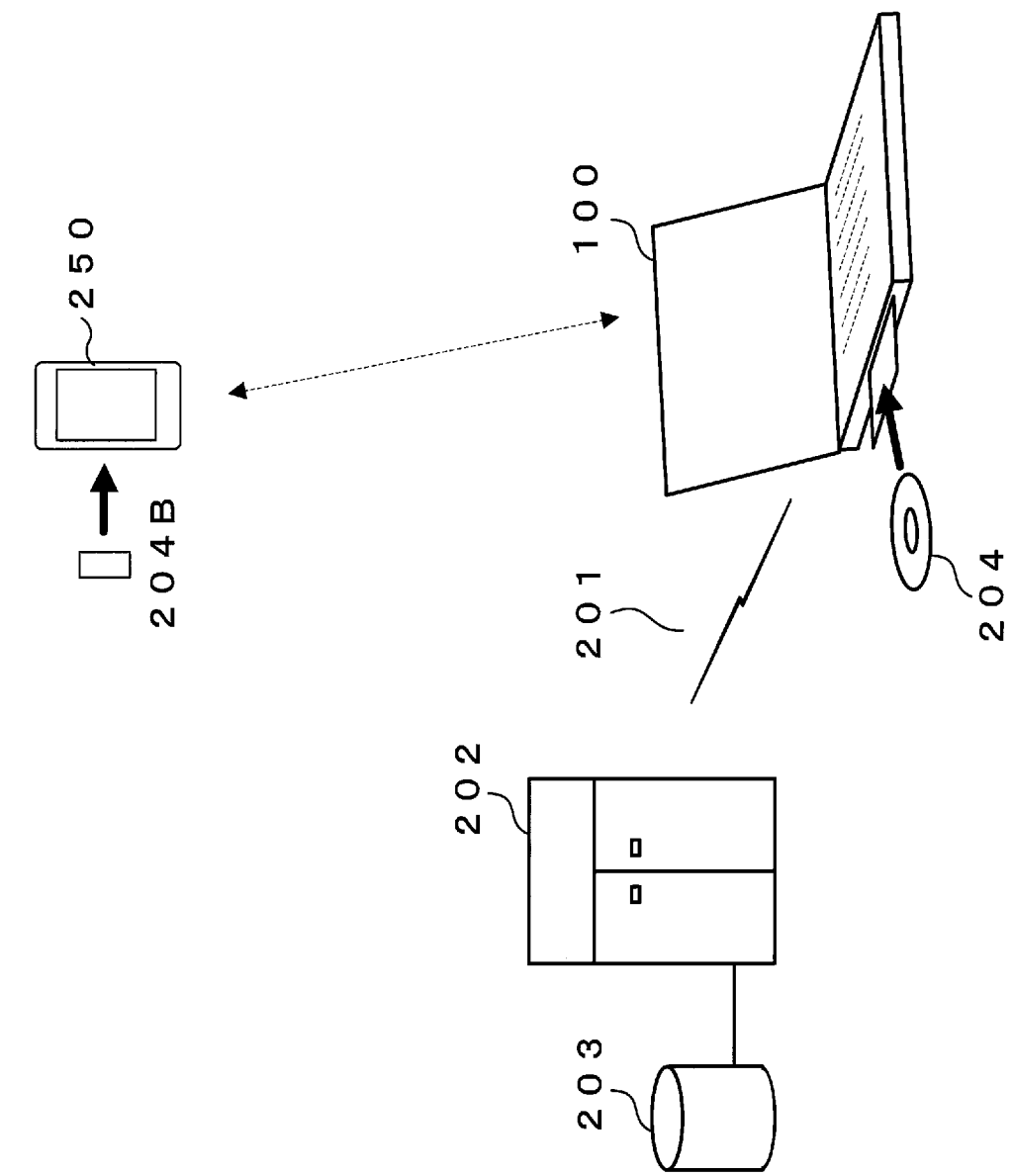
FIG. 13 is a diagram for explaining a modification.

Program supply in each of the above-described embodiments to the above-described high-performance mobile phone 250 or the mobile equipment such as a tablet terminal can be transmitted from an image display device (personal computer) 100 storing the program to the mobile equipment via infrared communication or near field communication, for example, as illustrated in FIG. 13.

Program supply to the personal computer 100 may be performed by setting a recording medium 204, such as a CD-ROM storing the program, in the personal computer 100, or loading the program to the personal computer 100 via a communication line 201 such as a network. In a case of supply via a communication line 201, the program is stored in a storage device 203 of a server 202 connected to the communication line.

The program can also be transmitted directly to the mobile equipment via an access point (not shown) of a wireless LAN connected to the communication line 201. Furthermore, a recording medium 204B such as a memory card storing program may be set in the mobile equipment. Thus, the program can be supplied as various forms of computer program products, such as provision via recording media and communication lines.

Third Modification and Fourth Modification

In the first and second embodiments described above, a cropping process, an enlarging process, and the like are performed during reproduction of a moving image. In a third modification, a cropping process, an enlarging process, and the like are performed during editing an image file.

In an image display device 100 according to the third modification, an image file of a moving image recorded in the storage device 102 is read, and the cropping process and the enlarging process are performed as in the first embodiment to generate a new image file. That is, for example, the images 501 and 502 of the frames F1 and F2 shown in FIG. 4 are recorded in a new image file without being changed. In contrast, in the frames F3 and F4, images 703 and 704 after the cropping process and the enlarging process are recorded in a new image file, instead of the original images 503 and 504.

In the new image file thus generated, a part of an image is enlarged and displayed on the monitor 104 in a scene where the moving velocity V of the camera 1 increases, without performing any cropping process, enlarging process, and the like during reproduction of the moving image.

Similarly, in an image display device 100 according to the fourth modification, an image file of a moving image recorded in the storage device 102 is read, and the region setting process and the sharpness reduction process are performed as in the second embodiment to generate a new image file. In this way, in the new image file thus generated, an image having its peripheral portion with a reduced sharpness is displayed on the monitor 104 in a scene where the moving velocity V of the camera 1 increases, without performing any region setting process, sharpness reduction process, and the like during reproduction of the moving image.

Fifth Modification

In the first and second embodiments described above, the image file contains information on the moving velocity of the image-capturing device at a time of capturing each frame of a moving image. However, even if the image file does not contain the information on the moving velocity of the image-capturing device, the moving velocity of the image-capturing device may be determined from a change in positional information on the image-capturing spot as long as the image file contains the positional information.

Additionally, if the image file does not contain information on the moving velocity of the image-capturing device, the moving velocity of the camera may be estimated from a speed at which a subject moves in the moving image.

Sixth Modification

Figure 14:
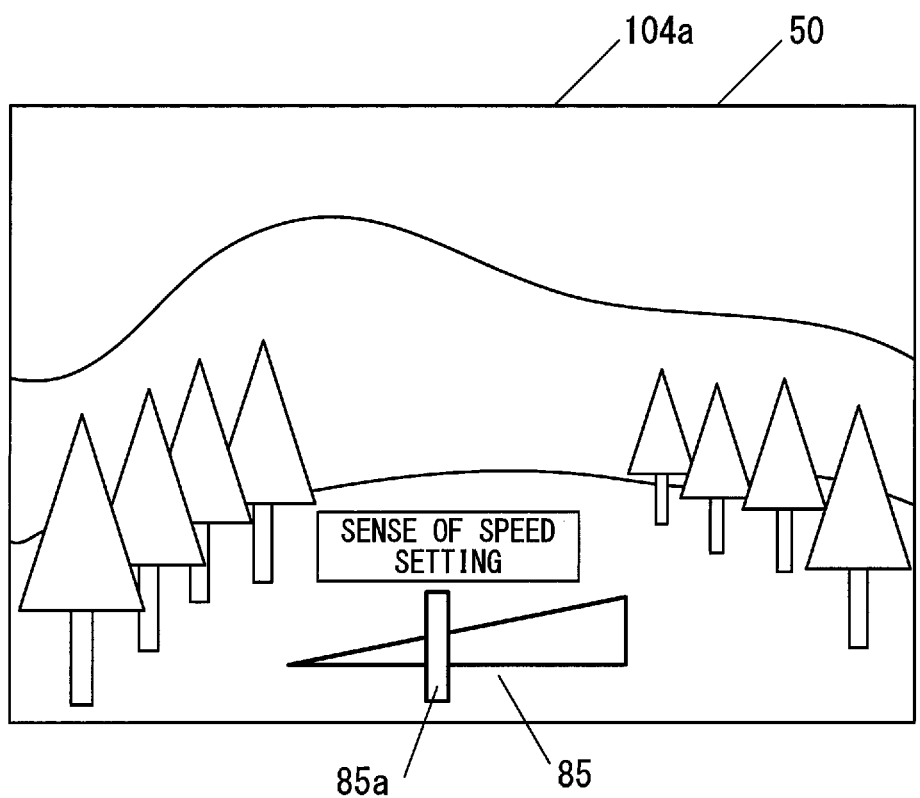
FIG. 14 is a diagram for explaining a modification.

Although the sense of speed felt by the viewer of a moving image is enhanced by the process in each of the first and second embodiments described above, the user may be allowed to set a degree of enhancement in the sense of speed. For example, as shown in FIG. 14, the control circuit 101 may display a setting display icon 85 for the user to set the degree of enhancement in the sense of speed, on the display screen 104a of the monitor 104. Then, for example, when the user operates the input member 106 to shift a slider 85a of the setting display icon 85 in the left-right direction, the degree of enhancement in the sense of speed by each process in each embodiment described above may be changed. For example, in the first embodiment, the sizes of the first and second cropped regions in the cropping process may be changed according to a position of the slider 85a. More specifically, the cropped region may be smaller as the position of the slider 85a shifts right. For example, in the second embodiment, the size of the process target region and the degree of reduction in the sharpness in the sharpness reduction process may be changed in accordance with the position of the slider 85a. More specifically, the sharpness of the target region may be reduced as the position of the slider 85a shifts right.

Figure 15:
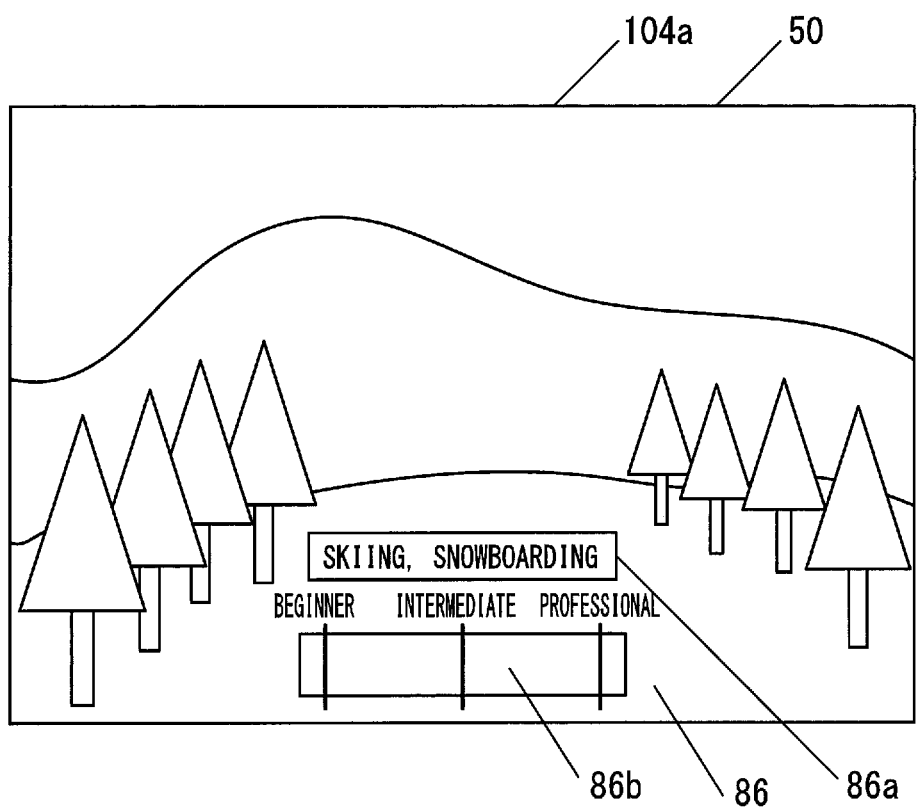
FIG. 15 is a diagram for explaining a modification.

Moreover, in sports such as in skiing and snowboarding where the photographer moves, for example, the sense of speed felt by the photographer varies according to the photographer's proficiency in the sport even for a given moving velocity of the photographer. The user may be allowed to set the degree of enhancement in the sense of speed according to a degree of proficiency of the photographer so that a sense of speed experienced by the photographer himself/herself is conveyed to the viewer of the moving image. For example, as shown in FIG. 15, the control circuit 101 may display a setting display icon 86 on a display screen 104*a* of the monitor 104, with a degree of proficiency of the photographer moving with the camera 1 being as a parameter. The setting display icon 86 can desirably be displayed in a plurality of different display forms depending on the type of sports. FIG. 15 shows an example of the setting display icon 86 in a case where the sport selected by the user is skiing or snowboarding. The display screen 104*a* shown in FIG. 15 displays a display icon 86*a* indicating that the sport selected by the user is skiing or snowboarding, and a selection display icon 86*b* for the degree of proficiency.

For example, when the user operates the input member 106 to select one of "beginner", "intermediate", and "professional" in the selection display icon 86*b*, a degree of enhancement in the sense of speed by each process in each embodiment described above may be changed in accordance with the selection.

Note that the user may also be allowed to set the degree of enhancement in the sense of speed as described above in the third and fourth embodiments.

In the first to fourth embodiments described above, the moving velocity of the camera 1 has been described as an example of the velocity information; however, the velocity information is not limited to the moving velocity of the camera 1. For example, the velocity information may be information on a distance between the camera 1 and a specific object. This is because the amount of change in the distance to a specific object changes as the velocity of the camera 1 increases. Specifically, the camera 1 changes the cropped region based on a magnitude (change amount, change rate) of a change in the distance between the camera 1 and the specific object.

In such an example, the control circuit 101 acquires information on a distance from the camera 1 to a specific object during photographing. For example, the distance information may be acquired (calculated) from the defocus amount or may be calculated from an output of the TOF sensor. These pieces of information may be acquired and recorded during photographing.

Note that the TOF sensor is an image sensor used for a known TOF (time of flight) method. The TOF method involves a technique of emitting a light pulse (irradiation light) from a light source unit (not shown) toward a subject and detecting a distance to a subject based on the time until the light pulse reflected from the subject returns to a TOF sensor. The control unit 34 calculates a relative velocity between the subject and the camera 1 based on a change in the detected distance to the subject, and sets the calculated relative velocity as the moving velocity V of the camera 1. Note that the image sensor 33*a* may be utilized for the TOF sensor.

The control circuit 101 calculates the distance change amount K (or change rate) from the acquired distance information. If the distance change amount K (or change rate) per unit time calculated at a first timing is less than a first predetermined value K1, the display range setting unit 101*b* does not change the cropped region. On the other hand, if the distance change amount K (or change rate) calculated by the control circuit 101 is equal to or more than the first predetermined value K1, the display range setting unit 101*b* makes the cropped region smaller.

More specifically, for a frame having a distance change amount K that is equal to or more than the first predetermined value K1 and is less than a second predetermined value K2 (K1<K2), the display range setting unit 101*b* sets a first cropped region with respect to the image of the frame. Additionally, for a frame having a distance change amount K that is equal to or more than the second predetermined value K2, the display range setting unit 101*b* sets a second cropped region that is smaller than the first cropped region with respect to the image of the frame.

Note that changing the cropped region in two stages in accordance with the distance change amount K (or change rate) is merely one example, and the cropped region may be changed in one stage, or in three or more stages. Further, instead of extending the cropped region in stages in accordance with the magnitude of the change in the distance as described above, the cropped region may be continuously changed in accordance with the distance change amount K (or change rate). Specifically, the cropped region may be made smaller as the distance change amount K (or change rate) increases. For example, in an initial setting, the cropped region is not set (for example, full angle of view display). The cropped region may then be made smaller as the distance change amount K (or change rate) increases.

In the first to fourth embodiments described above, the moving velocity of the camera 1 has been described as an example of the velocity information; however, the velocity information is not limited to the moving velocity of the camera 1. For example, the velocity information may be information on a size of a specific object. This is because the amount of change in the size of the specific object changes as the velocity of the camera 1 increases. Specifically, the camera 1 makes the cropped region smaller based on a magnitude (change amount, change rate) of a change in the size of the specific object.

In such an example, the control circuit 191 acquires information on a size of a photographed specific object. The size information may be acquired by using subject recognition (object recognition) technique and edge extraction technique. The display range setting unit 101*b* calculates a size change amount M (or change rate) from the acquired size information on the specific subject. If the size change amount M (or change rate) per unit time calculated at a first timing is less than a first predetermined value M1, the display range setting unit 101*b* does not change the cropped region. On the other hand, if the size change amount M (or change rate) calculated by a display circuit 101 is equal to or more than the first predetermined value M1, the display range setting unit 101*b* makes the cropped region smaller.

More specifically, for a frame having a size change amount M that is equal to or more than the first predetermined value M1 and is less than a second predetermined value M2 (M1<M2), the display range setting unit 101*b* sets a first cropped region with respect to the image of the frame. Additionally, for a frame having a size change amount M (or change rate) that is equal to or more than the second predetermined value M2, the display range setting unit 101*b* sets a second cropped region that is smaller than the first cropped region with respect to the image of the frame. Note that changing the cropped region in two stages in accordance with the size change amount M (or change rate) is merely one example, and the cropped region may be changed in one stage, or in three or more stages. Further, instead of extending the cropped region in stages in accordance with the size change amount M as described above, the cropped region may be continuously changed in accordance with the size change amount M (or change rate). Specifically, the exposure time may be extended as the size change amount M (or change rate) increases. For example, in an initial setting, the cropped region is not set (for example, full angle of view display). The cropped region may then be made smaller as the size change amount M (or change rate) increases.

In the first to fourth embodiments described above, the moving velocity of the camera 1 has been described as an example of the velocity information; however, the velocity information is not limited to the moving velocity of the camera 1. For example, the velocity information may be sound volume. This is because sound volume (in particular, wind noise volume) to be acquired becomes larger as the velocity of the camera 1 increases. Specifically, the camera 1 makes the cropped region smaller based on sound volume acquired during photographing.

In such an example, the control circuit 101 acquires information on sound volume during photographing. The sound volume information may be obtained by analyzing captured and recorded sound, as described above. Further, the control circuit 101 may acquire information on sound volume in a specific frequency band corresponding to wind noise. The control circuit 101 calculates a sound volume S from the acquired sound volume information. If the sound volume S is less than a first predetermined value S1, the display range setting unit 101b does not change the cropped region. On the other hand, if the sound volume S is equal to or more than the first predetermined value S1, the display range setting unit 101b makes the cropped region smaller.

More specifically, for a frame having a sound volume S that is equal to or more than the first predetermined value S1 and is less than a second predetermined value S2 (S1<S2), the display range setting unit 101b sets a first cropped region with respect to the image of the frame. Additionally, for a frame having a sound volume S that is equal to or more than the second predetermined value S2, the display range setting unit 101b sets a second cropped region that is smaller than the first cropped region with respect to the image of the frame. Note that changing the cropped region in two stages in accordance with the sound volume S is merely one example, and the cropped region may be changed in one stage, or in three or more stages. Further, instead of extending the cropped region in accordance with the sound volume S in stages as described above, the cropped region may be continuously changed in accordance with the sound volume S. Specifically, the cropped region may be made smaller as the sound volume S increases. For example, in an initial setting, the cropped region is not set (for example, full angle of view display). The cropped region may then be made smaller as the sound volume S increases.

Moreover, in the first to fourth embodiments described above, examples of making the cropped region smaller based on the moving velocity V, the distance change amount K (change rate), the size change amount M (change rate), and the sound volume S have been described. Of course, the cropped region may be made relatively larger when the moving velocity V becomes relatively low (when the distance change amount K becomes low, when the size change amount becomes low, when the sound volume becomes low).

Now, another example of setting a region to be subjected to the process for reducing the sharpness described in the second and fourth embodiments will be described. In the first to fourth embodiments described above, the moving velocity of the camera 1 has been described as an example of the velocity information for reducing sharpness of a peripheral portion of an image; however, the velocity information is not limited to the moving velocity of the camera 1. For example, the velocity information may be information on a distance between the camera 1 and a specific object. Specifically, the camera 1 changes the process target region based on a magnitude (change amount, change rate) of a change in the distance between the camera 1 and the specific object.

The control circuit 101A calculates the distance change amount K (or change rate) from the acquired distance information. If the distance change amount K (or change rate) per unit time calculated at a first timing is less than a first predetermined value K1, the process target region setting unit 101d does not change the process target region. On the other hand, if the distance change amount K (or change rate) calculated by the control circuit 101A is equal to or more than the first predetermined value K1, the process target region setting unit 101d makes the process target region larger.

More specifically, for a frame having a distance change amount K that is equal to or more than the first predetermined value K1 and is less than a second predetermined value K2 (K1<K2), the process target region setting unit 101d sets a first process target region with respect to the image of the frame. Additionally, for a frame having a distance change amount K that is equal to or more than the second predetermined value K2, the process target region setting unit 101d sets a second process target region that is larger than the first process target region with respect to the image of the frame.

Note that changing the cropped region in two stages in accordance with the distance change amount K (or change rate) is merely one example, and the cropped region may be changed in one stage, or in three or more stages. Further, instead of extending the process target region in stages in accordance with the magnitude of the change in the distance as described above, the process target region may be continuously changed in accordance with the distance change amount K (or change rate). Specifically, the process target region may be made larger as the distance change amount K (or change rate) increases. For example, in an initial setting, the process target region is not set (for example, full angle of view display). The process target region may then be made larger as the distance change amount K (or change rate) increases.

In the second embodiment described above, the moving velocity of the camera 1 has been described as an example of the velocity information; however, the velocity information is not limited to the moving velocity of the camera 1. For example, the velocity information may be information on a size of a specific object. Specifically, the camera 1 makes the process target region larger based on a magnitude (change amount, change rate) of a change in the size of the specific object.

In such an example, the control circuit 101A acquires information on a size of a photographed specific object. If the size change amount M (or change rate) per unit time calculated at a first timing is less than a first predetermined value M1, the process target region setting unit 101d does not change the process target region. On the other hand, if the size change amount M (or change rate) calculated by the control circuit 101A is equal to or more than the first predetermined value M1, the process target region setting unit 101d makes the process target region larger.

More specifically, for a frame having a size change amount M that is equal to or more than the first predetermined value M1 and is less than a second predetermined value M2 (M1<M2), the process target region setting unit 101d sets a first process target region with respect to the image of the frame. Additionally, for a frame having a size change amount M (or change rate) that is equal to or more than the second predetermined value M2, the process target region setting unit 101*d* sets a second process target region that is larger than the first process target region with respect to the image of the frame. Note that changing the process target region in two stages in accordance with the size change amount M (or change rate) is merely one example, and the process target region may be changed in one stage, or in three or more stages. Further, instead of extending the process target region in stages in accordance with the size change amount M as described above, the process target region may be continuously changed in accordance with the size change amount M (or change rate). Specifically, the process target region may be made larger as the size change amount M (or change rate) increases. For example, in an initial setting, the process target region is not set (for example, full angle of view display). The process target region may then be made larger as the size change amount M (or change rate) increases.

In the second embodiments described above, the moving velocity of the camera 1 has been described as an example of the velocity information; however, the velocity information is not limited to the moving velocity of the camera 1. For example, the velocity information may be sound volume. Specifically, the camera 1 makes the process target region larger based on sound volume acquired during photographing.

In such an example, the control circuit 101A acquires information on sound volume during photographing. The sound volume information may be obtained by analyzing captured and recorded sound, as described above. Further, the control circuit 100A may acquire information on sound volume in a specific frequency band corresponding to wind noise. The control circuit 101A calculates a sound volume S from the acquired sound volume information. If the sound volume S is less than a first predetermined value S1, the process target region setting unit 101*d* does not change the process target region. On the other hand, if the sound volume S is equal to or more than the first predetermined value S1, the process target region setting unit 101*d* makes the process target region larger.

More specifically, for a frame having a sound volume S that is equal to or more than the first predetermined value S1 and is less than a second predetermined value S2 (S1<S2), the process target region setting unit 101*d* sets a first process target region with respect to the image of the frame. Additionally, for a frame having a sound volume S that is equal to or more than the second predetermined value S2, the process target region setting unit 101*d* sets a second process target region that is larger than the first process target region with respect to the image of the frame. Note that changing the process target region in two stages in accordance with the sound volume S is merely one example, and the process target region may be changed in one stage, or in three or more stages. Further, instead of making the process target region larger in stages in accordance with the sound volume S as described above, the process target region may be continuously changed in accordance with the sound volume S. Specifically, the process target region may be made larger as the sound volume S increases. For example, in an initial setting, the process target region is not set (for example, full angle of view display). The process target region may then be made smaller as the sound volume S increases.

In the second embodiment described above, examples of making the process target region larger based on the moving velocity V, the distance change amount K (change rate), the size change amount M (change rate), and the sound volume S have been described. Of course, the process target region may be made relatively smaller when the moving velocity V becomes relatively low (when the distance change amount K becomes low, when the size change amount becomes low, when the sound volume becomes low).

The embodiment and modification described above also include the following display devices.

(1) A display device comprising: an acquisition unit that acquires moving image data generated by an image-capturing device and velocity information on the image-capturing device while generating the moving image data; and a display control unit that controls a region to be processed for a moving image to be displayed on a display unit using the moving image data, based on the velocity information acquired by the acquisition unit.

(2) The display device as in (1), wherein: the acquisition unit acquires information on a moving velocity of the image-capturing device; and the display control unit controls a region of the moving image to be processed based on information on the moving velocity acquired by the acquisition unit.

(3) The display device as in (2), wherein: the display control unit makes a region of the moving image to be displayed on the display unit smaller as the moving velocity increases.

(4) The display device as in (3), wherein: the display control unit displays a second region that is smaller than a first region of the moving image on the display unit when the moving velocity becomes a second moving velocity that is higher than a first moving velocity.

(5) The display device as in (2), comprising: an image processing unit that performs image processing on a partial region of the moving image, wherein: the image processing unit makes a region subjected to image processing larger as the moving velocity increases; and the display control unit displays a moving image having a partial region subjected to image processing by the image processing unit.

(6) The display device as in (5), wherein: the image processing unit performs image processing on a second region that is larger than a first region in the entire region of the moving image when the moving velocity of the image-capturing device becomes a second moving velocity that is higher than a first moving velocity.

(7) The display device as in (2), wherein: the display control unit displays an image obtained by adding blur to a specific subject of the moving image based on information on the moving velocity.

(8) The display device as in (1), wherein: the acquisition unit acquires information on a distance between the image-capturing device and a specific object; and the display control unit controls a region of the moving image to be processed based on a magnitude of change in distance according to distance information acquired by the acquisition unit.

(9) The display device as in (8), wherein: the display control unit makes a region of the moving image to be displayed on the display unit smaller as a change in the distance increases.

(10) The display device as in (9), wherein: the display control unit displays a second region that is smaller than a first region of the moving image when the magnitude of the change in the distance becomes a second magnitude that is larger than a first magnitude.

(11) The display device as in (8), comprising: an image processing unit that performs image processing on a partial region of the moving image, wherein: the image processing unit makes a region subjected to image processing larger as a change in the distance increases; and the display control unit displays a moving image having a partial region subjected to image processing by the image processing unit.

(12) The display device as in (11), wherein: the image processing unit performs image processing on a second region that is larger than a first region in the entire region of the moving image when the magnitude of the change in the distance becomes a second magnitude that is larger than a first magnitude.

(13) The display device as in (8), wherein: the display control unit displays an image obtained by adding blur to a specific subject of the moving image based on information on the magnitude of the change in the distance.

(14) The display device as in (1), wherein: the acquisition unit acquires information on a size of a specific object; and the display control unit controls a region of the moving image to be processed based on the magnitude of the change in the size acquired by the acquisition unit. (15) The display device as in (14), wherein: the display control unit makes a region of the moving image to be displayed on the display unit smaller as the change in the size increases.

(16) The display device as in (15), wherein: the display control unit displays a second region that is smaller than a first region of the moving image when the magnitude of the change in the size becomes a second magnitude that is larger than a first magnitude.

(17) The display device as in (14), comprising: an image processing unit that performs image processing on a partial region of the moving image, wherein: the image processing unit makes a region subjected to image processing larger as the change in the size increases; and the display control unit displays a moving image having a partial region subjected to image processing by the image processing unit.

(18) The display device as in (17), wherein: the image processing unit performs image processing on a second region that is larger than a first region in the entire region of the moving image when the change in the size becomes a second magnitude that is larger than a first magnitude.

(19) The display device as in (14), wherein: the display control unit displays an image obtained by adding blur to a specific subject of the moving image based on information on the change in the size.

(20) The display device as in (1), wherein: the acquisition unit acquires sound information; and the display control unit controls a region of the moving image to be processed based on a volume of the sound.

(21) The display device as in (20), wherein: the display control unit makes a region of the moving image to be displayed on the display unit smaller as the volume of the sound increases.

(22) The display device as in (21), wherein: the display control unit displays a second region that is smaller than a first region of the moving image when the volume of the sound becomes a second volume that is larger than a first volume.

(23) The display device as in (20), comprising: an image processing unit that performs image processing on a partial region of the moving image, wherein: the image processing unit makes a region subjected to image processing larger as the volume of the sound increases; and the display control unit displays a moving image having a partial region subjected to image processing by the image processing unit.

(24) The display device as in (23), wherein: the image processing unit performs image processing on a second region that is larger than a first region in the entire region of the moving image when the volume of the sound becomes a second volume that is larger than a first volume.

(25) The display device as in (20), wherein: the display control unit displays an image obtained by adding blur to a specific subject of the moving image based on the volume of the sound.

Additionally, the embodiments and modifications described above also include the following program.

(26) A program that causes the computer to execute: a first step of acquiring moving image data generated by an image-capturing device and velocity information on the image-capturing device while generating the moving image data; and a second step of controlling a region to be processed for a moving image to be displayed on a display unit using the moving image data based on the velocity information acquired in the first step.

Although various embodiments and modifications have been described in the above description, the present invention is not limited thereto. Other aspects contemplated within the technical idea of the present invention are also included within the scope of the present invention.

The disclosure of the following priority application is herein incorporated by reference:

Japanese Patent Application No. 2016-194631 (filed on Sep. 30, 2016)

REFERENCE SIGNS LIST

100; image display device
101, 101A; control circuit
101a; image data input unit
101b; display range setting unit
101c; display image generation unit
101d; process target region setting unit
104; monitor

The invention claimed is:

1. A display device comprising:
a hardware processor programmed to:
acquire (i) moving image data generated by an image-capturing device capturing images in a moving direction of the image-capturing device in a third region of an image sensor and (ii) velocity information of the image-capturing device while generating the moving image data; and
display a first region of a moving image generated by capturing the images in the third region of the image sensor that has been acquired on a display screen when a moving velocity determined based on the velocity information that has been acquired is a first moving velocity, and display a second region that is smaller than the first region of the moving image generated by capturing the images in the third region of the image sensor on the display screen when the moving velocity becomes a second moving velocity that is higher than the first moving velocity.

2. The display device according to claim 1, wherein:
the hardware processor is programmed to make a region of the moving image to be displayed on the display screen smaller as the moving velocity increases.

3. A display device comprising:
a hardware processor programmed to:
acquire (i) moving image data generated by an image-capturing device capturing images in a moving direction of the image-capturing device in a first region of an image sensor and (ii) velocity information of the image-capturing device while generating the moving image data;
perform image processing on a partial region of a moving image that is generated by capturing the images in the first region of the image sensor when displaying the moving image on a display screen; and display the moving image having the partial region subjected to the image processing, wherein:

the hardware processor makes the partial region where the image processing is performed on the moving image generated by capturing the images in the first region of the image sensor larger as a moving velocity determined based on the velocity information increases.

4. The display device according to claim 3, wherein:
the hardware processor performs the image processing on a second partial region that is larger than a first partial region when the moving velocity of the image-capturing device becomes a second moving velocity that is higher than a first moving velocity.

5. A non-transitory computer-readable storage medium on which is stored a program that, when executed by a computer, causes the computer to execute:

a first step of acquiring (i) moving image data generated by an image-capturing device capturing images in a moving direction of the image-capturing device in a third region of an image sensor and (ii) velocity information of the image-capturing device while generating the moving image data; and a second step of displaying a first region of a moving image generated by capturing the images in the third region of the image sensor that has been acquired on a display screen when a moving velocity determined based on the velocity information acquired by the first step is a first moving velocity, and displaying a second region that is smaller than the first region of the moving image generated by capturing the images in the third region of the image sensor on the display screen when the moving velocity becomes a second moving velocity that is higher than the first moving velocity.

6. A display device comprising:
a hardware processor programmed to:

acquire (i) moving image data generated by an image-capturing device capturing images in a moving direction of the image-capturing device in a third region of an image sensor and (ii) information on movement of the image-capturing device during image-capturing by the image-capturing device; and display a first region of a moving image generated by capturing the images in the third region of the image sensor that has been acquired on a display screen when a moving velocity determined based on the information on movement that has been acquired is a first moving velocity, and display a second region that is smaller than the first region of the moving image generated by capturing the images in the third region of the image sensor on the display screen when the moving velocity becomes a second moving velocity that is higher than the first moving velocity.

* * * * *